United States Patent [19]

Burke, Jr.

[11] 3,879,327

[45] Apr. 22, 1975

[54] FORMATION OF A LATEX FROM AN ORGANIC SOLVENT DISPERSION OF A WATER INSOLUBLE POLYMER

[75] Inventor: Oliver W. Burke, Jr., Fort Lauderdale, Fla.

[73] Assignee: Exxon Research and Engineering Company, Linden, N.J.

[22] Filed: Feb. 15, 1972

[21] Appl. No.: 226,419

Related U.S. Application Data

[63] Continuation-in-part of Ser. No. 817,494, April 18, 1969, abandoned, which is a continuation-in-part of Ser. No. 621,997, March 7, 1967, Pat. No. 3,503,917.

[52] U.S. Cl.............. 260/29.6 XA; 204/159.22; 260/29.4 R; 260/29.2 E; 260/29.6 R; 260/29.7 R

[51] Int. Cl. .......................................... C08f 45/24

[58] Field of Search .. 260/29.6 R, 29.7 R, 29.6 XA, 260/29.6 PT, 29.6 PM

[56] References Cited
UNITED STATES PATENTS

| | | | |
|---|---|---|---|
| 2,403,966 | 7/1946 | Brown et al. | 260/29.7 B |
| 2,959,561 | 11/1960 | Kelley | 260/29.7 B |
| 3,007,852 | 11/1961 | Hunter et al. | 260/29.7 B |
| 3,129,132 | 4/1964 | Gudheim | 260/29.7 PT |
| 3,244,660 | 4/1966 | Herold | 260/34.2 |
| 3,277,037 | 10/1966 | Halper et al. | 260/29.6 OL |
| 3,281,386 | 10/1966 | Moss | 260/29.7 R |
| 3,287,301 | 11/1966 | Fysh et al. | 260/29.6 OL |
| 3,294,719 | 12/1966 | Halper et al. | 260/29.6 OL |
| 3,310,515 | 12/1966 | Halper et al. | 260/29.6 OL |
| 3,432,483 | 3/1969 | Moss | 260/29.7 R |
| 3,445,414 | 5/1969 | Glymph et al. | 260/29.6 PT |
| 3,503,917 | 3/1970 | Burke | 260/29.6 R |
| 3,644,263 | 2/1972 | Burke | 260/29.7 R |
| 3,652,482 | 3/1972 | Burke | 260/29.6 R |

*Primary Examiner*—Harold D. Anderson
*Attorney, Agent, or Firm*—Hall & Houghton

[57] ABSTRACT

The preparation of stable aqueous latices from solvent dispersions of elastomers and other high polymer compositions has presented problems including excessive viscosity during processing and foaming, which have produced losses and increased costs. Herein combinations of steps are disclosed which reduce or eliminate various of these problems and enable the preparation of stable latices of high solids content. The process is characterized, inter alia, by the establishment of a flow of steam as a continuous phase into which an emulsion of a cement of the polymer is dispersed as an aerosol of latex droplets in a solvent-vapor continuum, followed by coalescence of the latex droplets and separation of the resulting coalesced liquid phase from the resulting solvent-vapor phase. In one embodiment of the present method an aqueous emulsion is prepared the dispersed phase of which principally comprises particles of precursor latex particle size and which may contain a lesser proportion of particles of greater than precursor latex particle size. This emulsion is converted to a stable latex by subjecting the same to special conditions which cause selective agglomeration of the particles of greater than precursor latex particle size, and removing the so agglomerated particles to yield a latex essentially free of particles of greater than colloidal size.

The separation of the gaseous and liquid latex phases is effected by impinging the same on a liquid body, preferably a flow of partially concentrated liquid latex; and other features of said copending applications may also be employed.

In the present disclosure, in addition, special provisions are made for eliminating from the latex particles of greater than colloidal size by controlling the heating and stripping operations so that in combination, such larger particles or the precursors thereof are coagulated and removed without coagulation of the latex of colloidal sized particles.

Furthermore, special provisions are made for coagulum removal and recovery, and to contribute to a more expeditious processing of the materials into stable latices and a reduction in coagulum losses and increase in efficiency.

21 Claims, 18 Drawing Figures

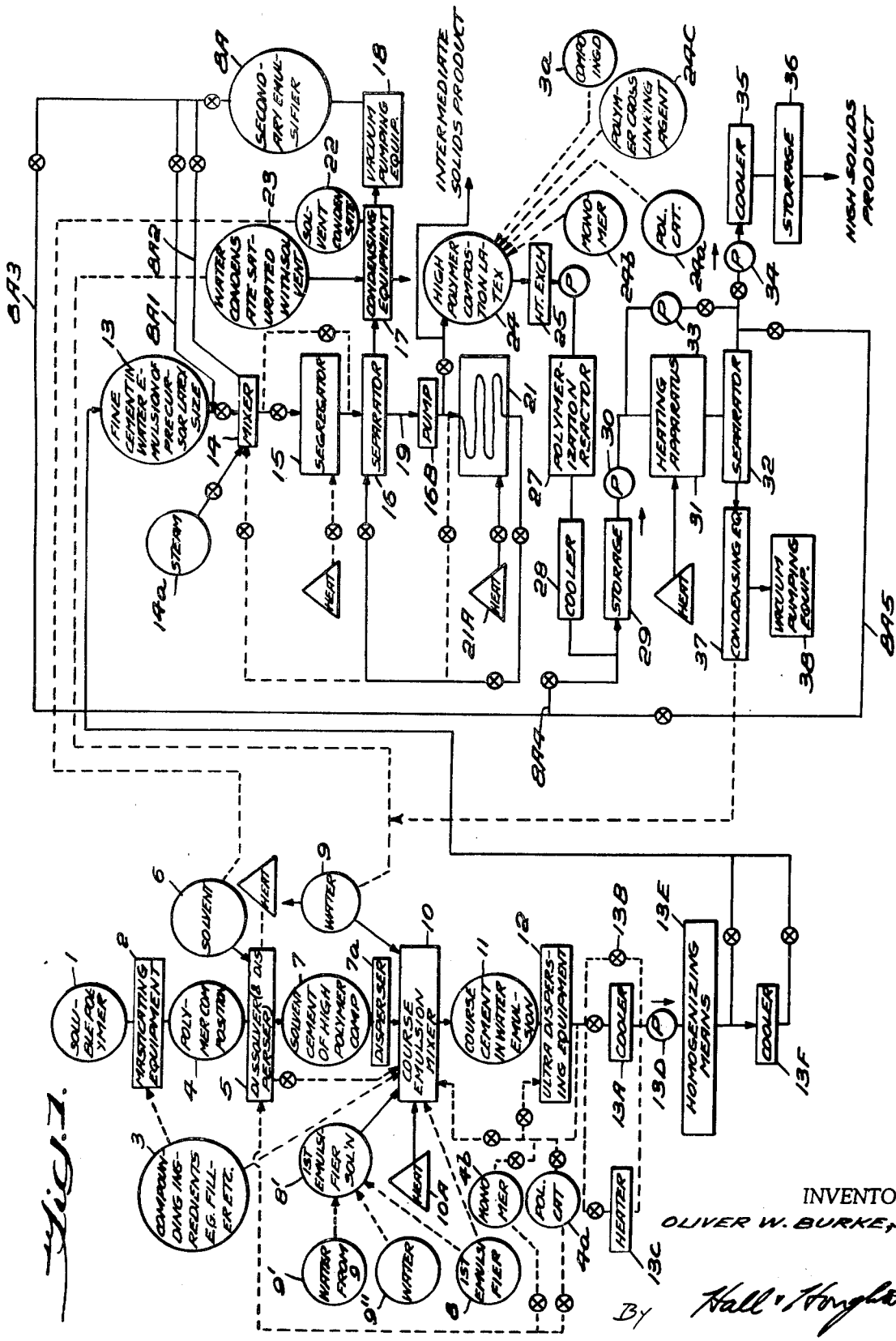

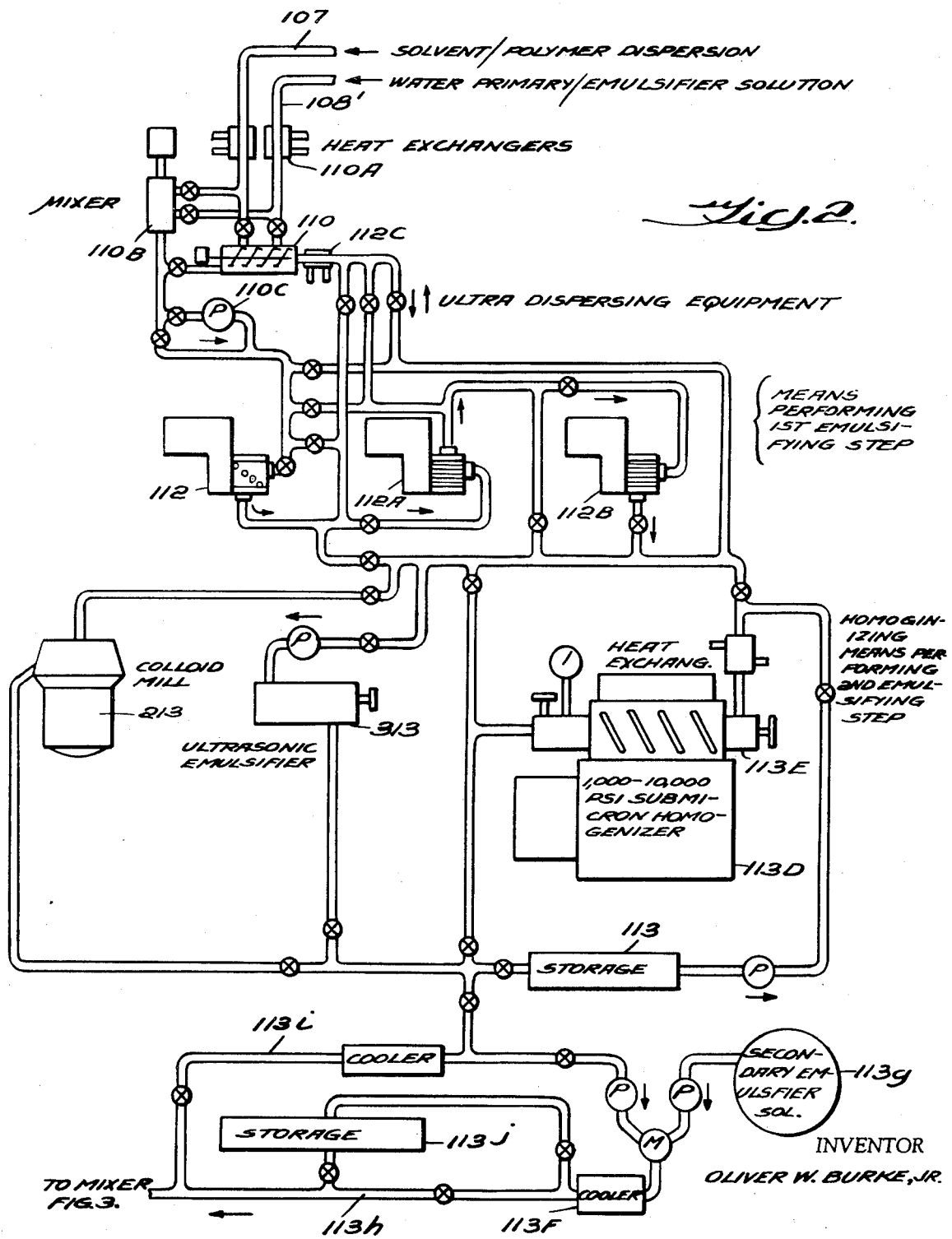

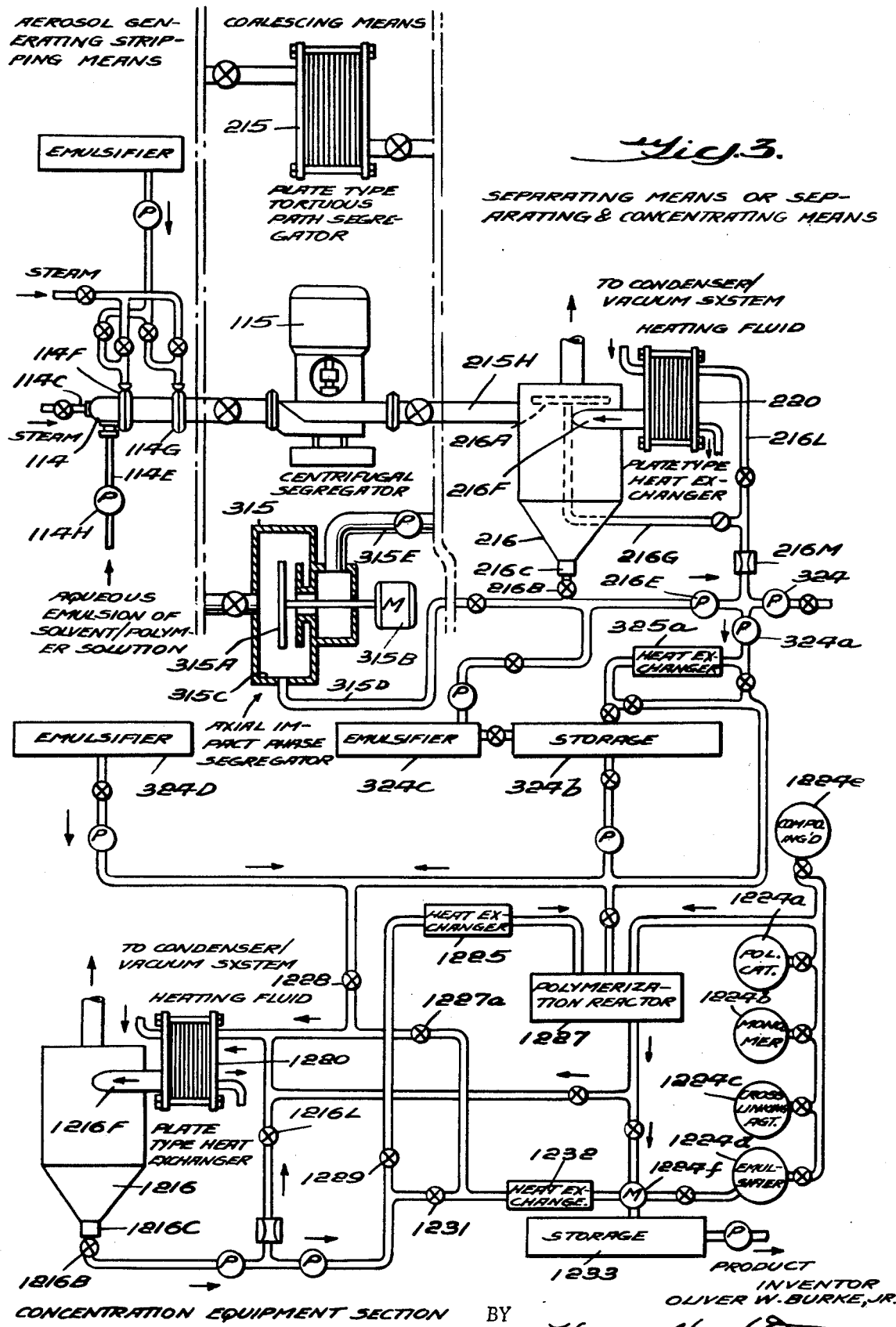

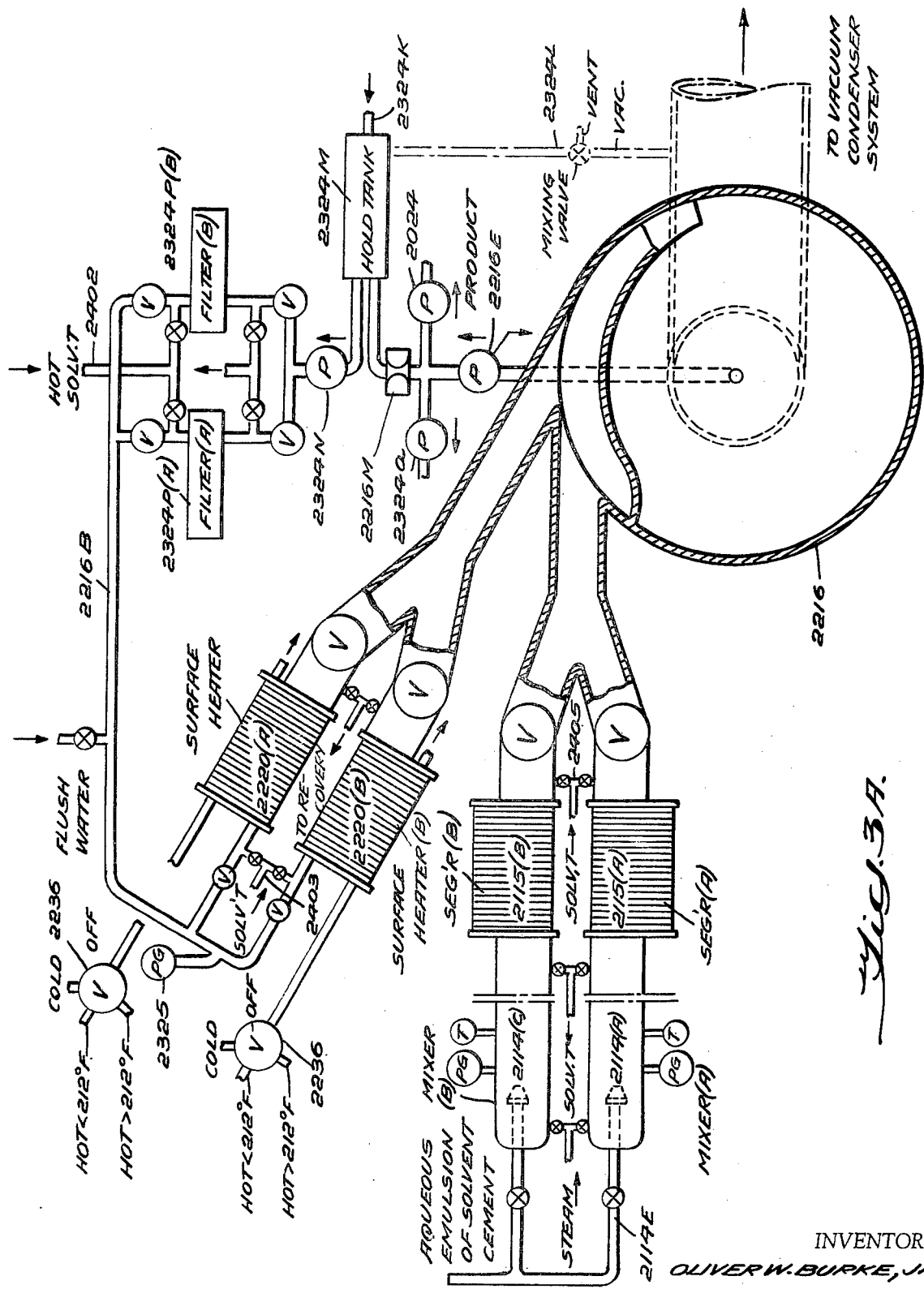

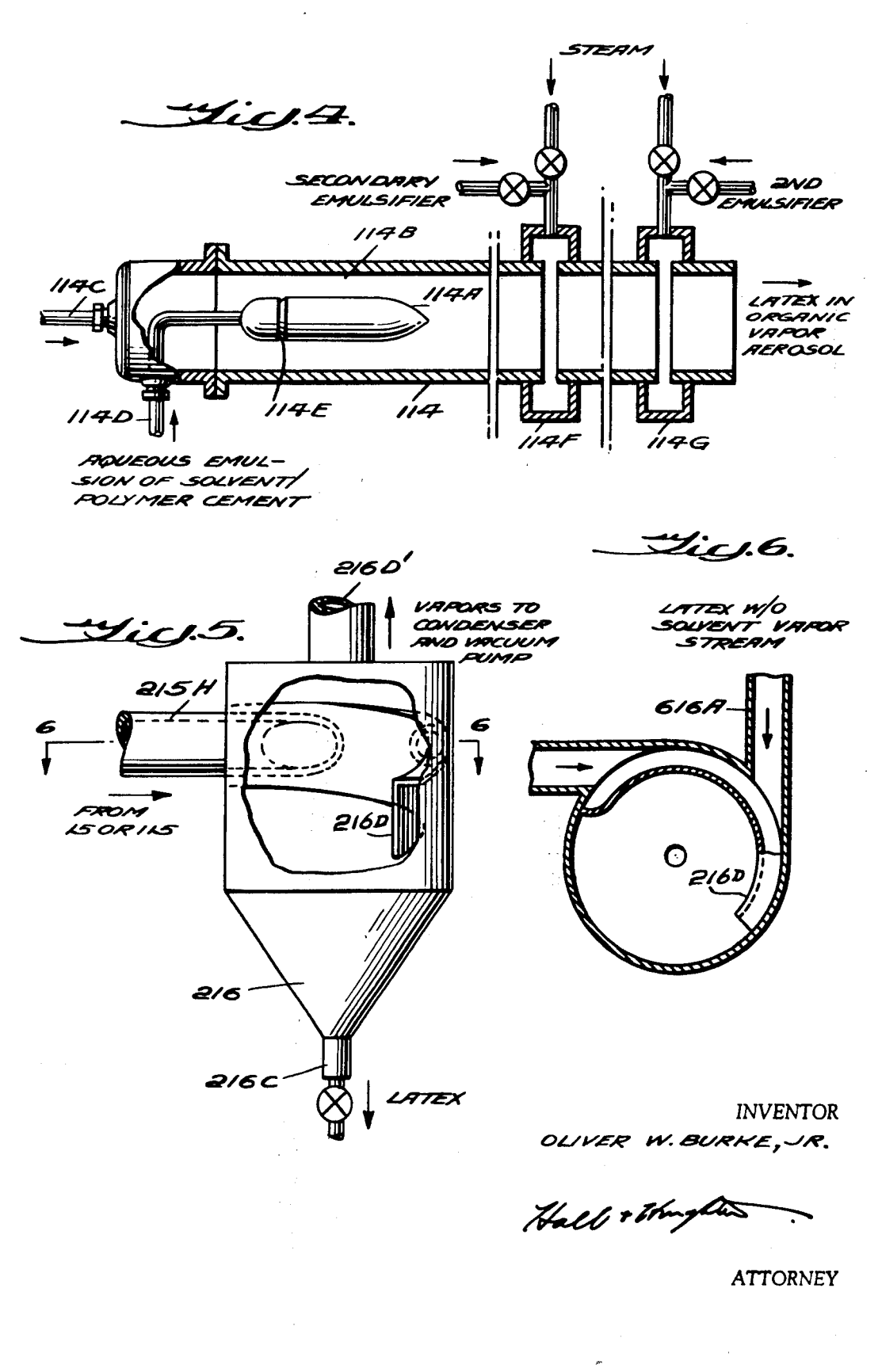

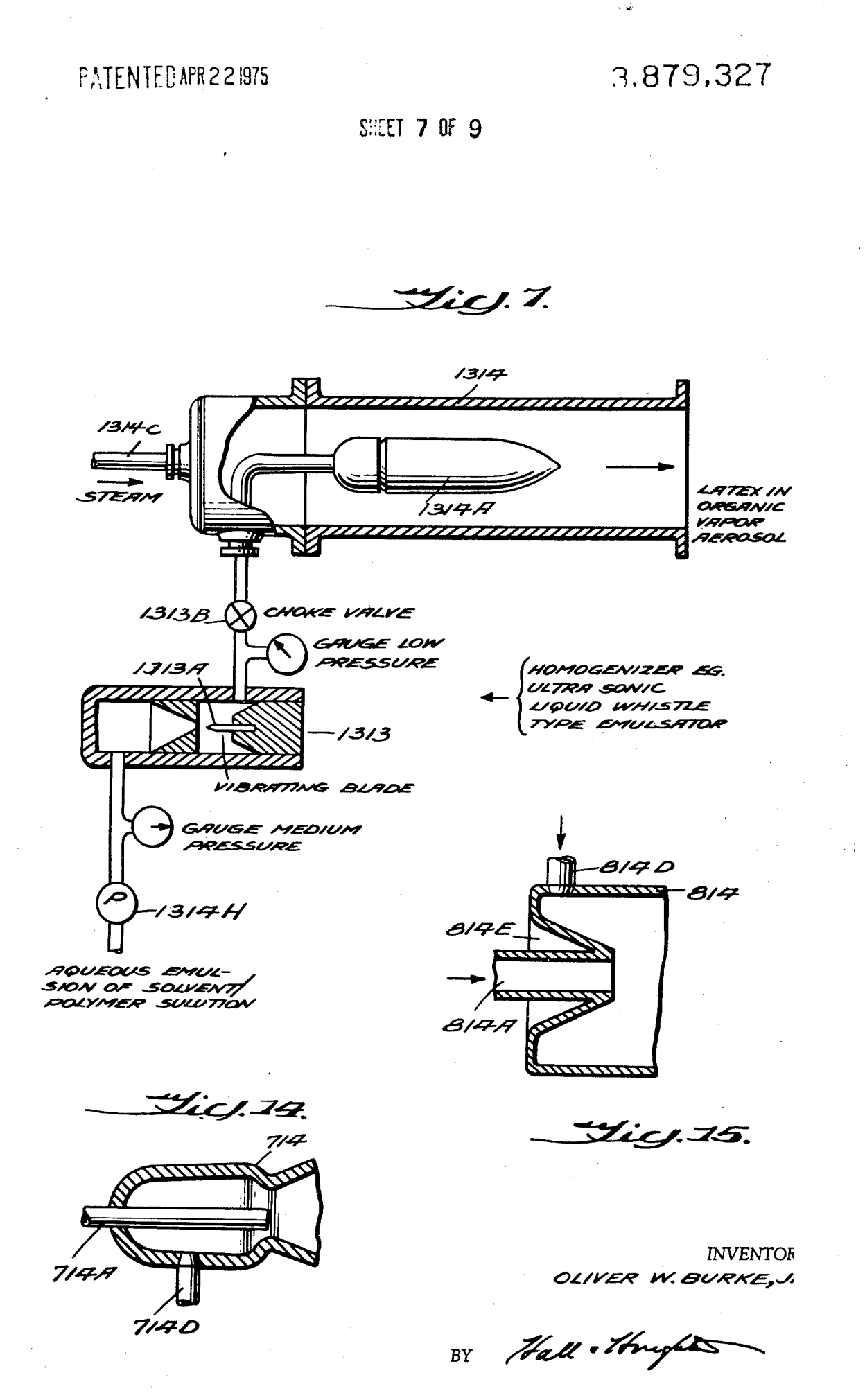

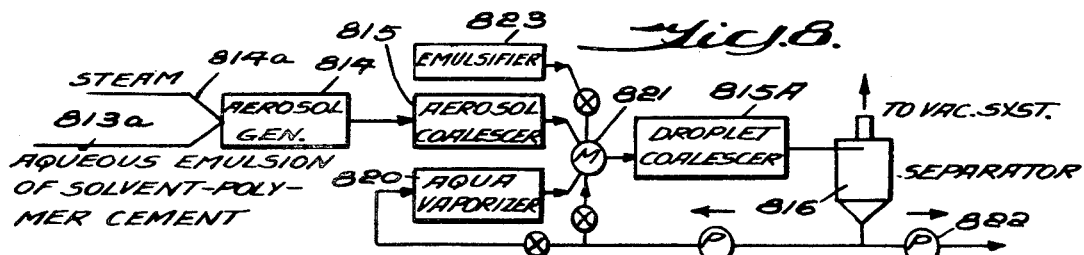
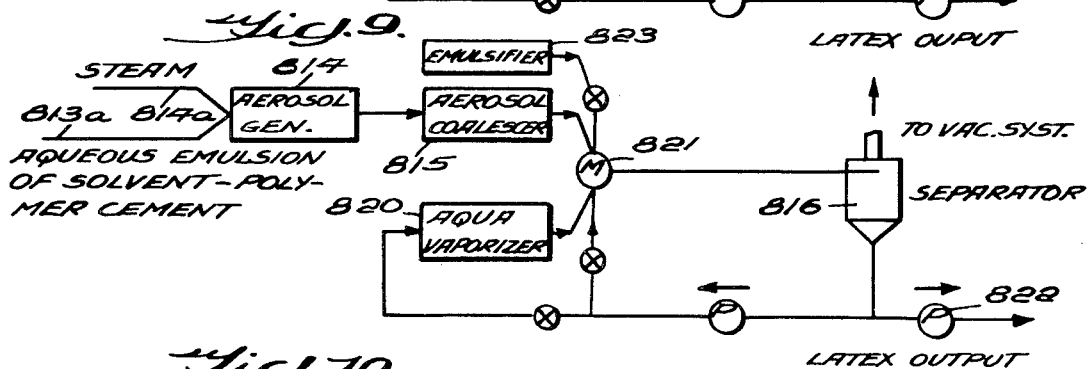
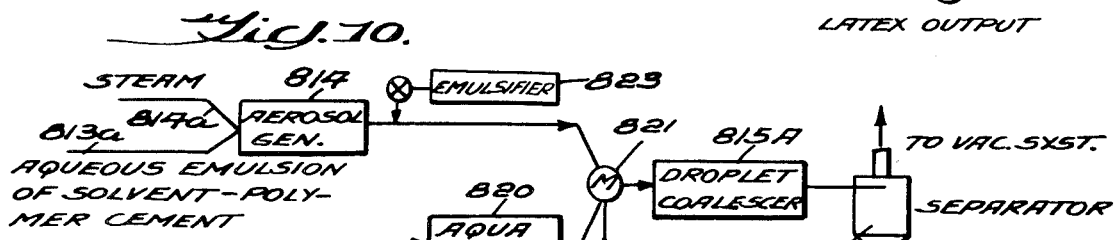
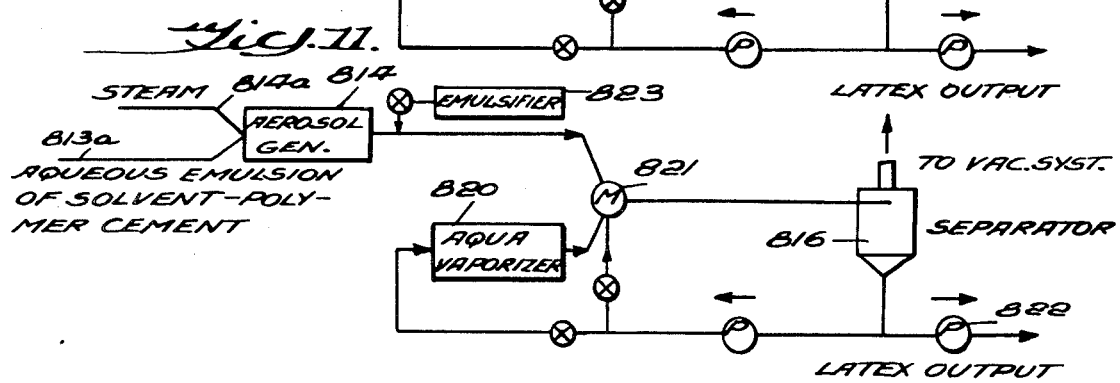
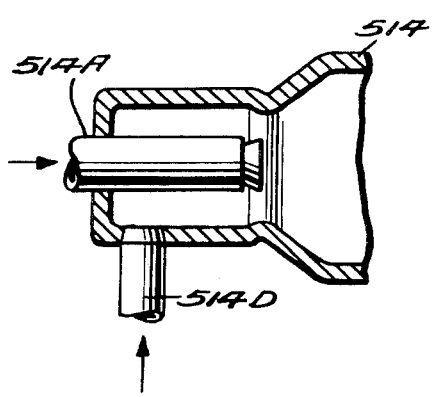
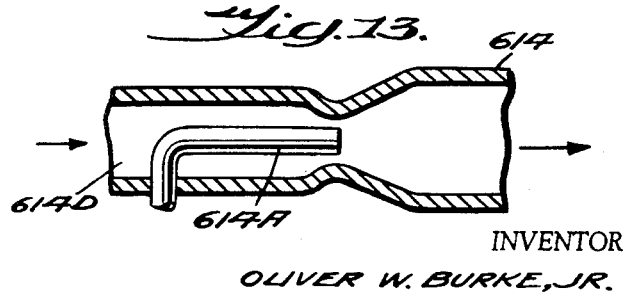
INVENTOR
OLIVER W. BURKE, JR.
BY Hall + Hughes

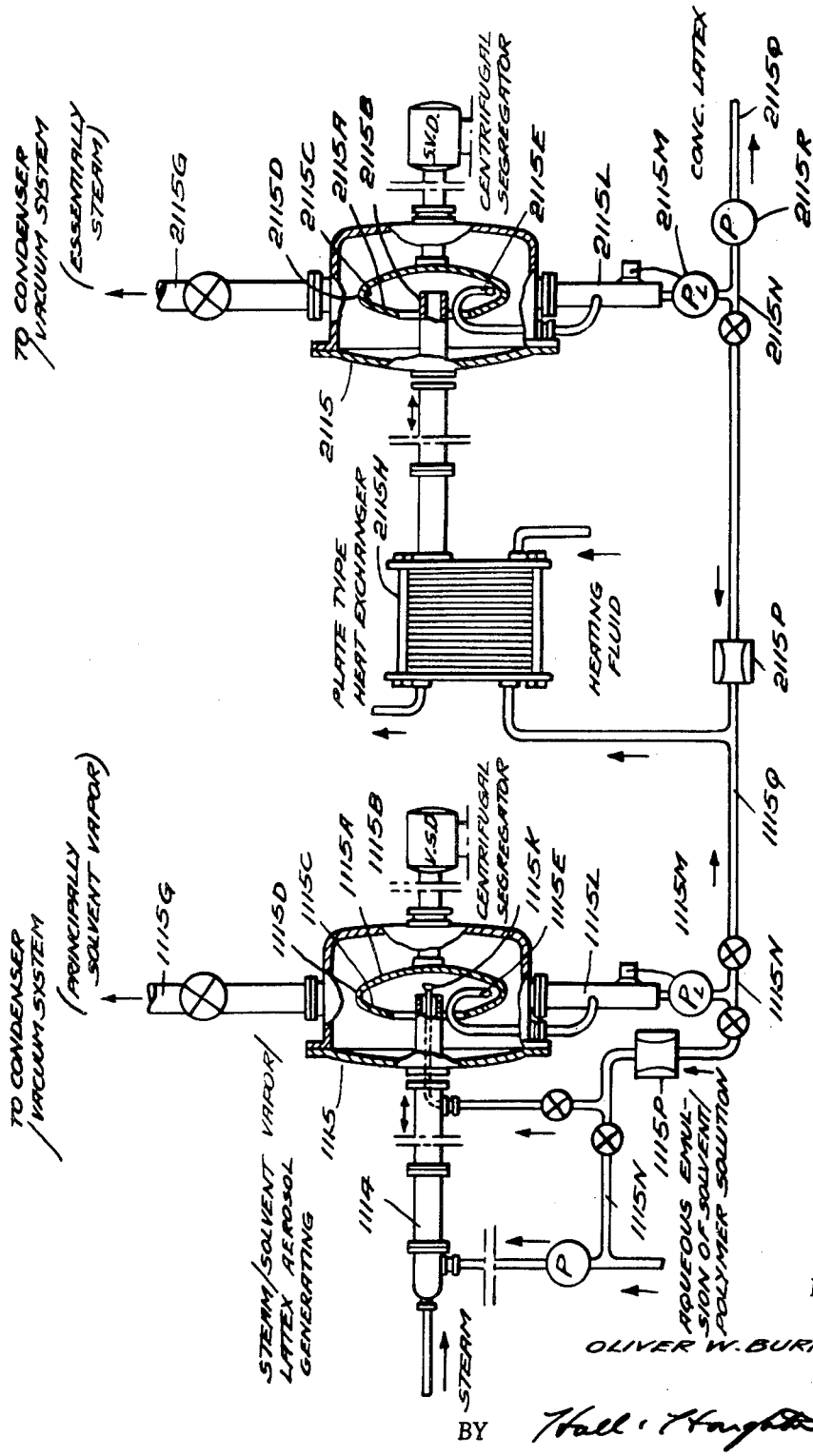

3,879,327

FORMATION OF A LATEX FROM AN ORGANIC SOLVENT DISPERSION OF A WATER INSOLUBLE POLYMER

Cross Reference to Related Applications

This application is a continuation in part of my application Ser. No. 817,494 filed Apr. 18, 1969, now abandoned in favor hereof, and is an improvement over and continuation-in-part of my applications Ser. No. 621,997, filed Mar. 7, 1967, U.S. (Pat. No. 3,503,917 issued Mar. 31, 1970); Ser. No. 691,823, filed Dec. 19, 1967, abandoned after the filing of application Ser. No. 70,949, (now U.S. Pat. No. 3,652,482 issued Mar. 28, 1972), on Sept. 10, 1970 to replace said Ser. No. 691,823; Ser No. 767,790, filed Oct. 15, 1968, and Ser. No. 784,596 filed Dec. 18, 1968, (now U.S. Pat. No. 3,644,263 issued Feb. 22, 1972), 784,596 filed Dec. 18, 1968, (now U.S. Pat. No. 3,644,263 issued Feb. 22, 1972), the disclosures of all of which are herein incorporated by reference.

BACKGROUND OF THE INVENTION

1. Field of the Invention

This invention like those of my aforesaid copending applications relates to the production of high solids content aqueous latices with reduced polymer losses from solvent dispersions of high polymer compositions, and aims generally to provide improved method and apparatus combinations therefor, and new products produced thereby.

2. Description of the Prior Art

To date, in the practical art, synthetic latices of high polymers have been primarily prepared by emulsion polymerization, which can produce latices of uniform colloidal particle size. In contrast, such result is very difficult to obtain when employing high polymers made by essentially anhydrous catalyst polymerizations. In this latter case it has been proposed to prepare aqueous latices of high polymers from solvent solutions thereof by processes of the type which comprise the general steps of (1) providing a dispersion or cement of the polymer in a volatile organic solvent for the polymer, (2) adding to such dispersion water and an aqueous emulsifier therefor and emulsifying the same to produce an emulsion, (3) stripping the volatile organic solvent from the said emulsion, and (4) recovering the resulting latex product. However, in the practical art difficulty has been experienced in attempting to render such proposed processes commercially feasible, inter alia, in that (1) aqueous emulsification and stripping of solvent dispersions or cements of the high polymer materials, especially when dilute, have yielded latices of only medium solids content at high viscosity which render them commercially impractical; (2) in that the emulsions have tended to foam excessively during stripping; and (3) in that the emulsions have tended to form coagulum by coalescence of the polymer phase as well as by drying out especially on contact with heated surfaces, during the stripping and/or concentrating processes, and (4) in that such processes have tended to yield latices of poor mechanical stability, i. e. latices which when subjected to mechanical shear during blending with other materials in the industrial applications thereof, are apt to undergo coagulation thereby rendering the blended materials unsuitable for their intended latex applications.

SUMMARY OF THE INVENTION

The particular improvements distinguishing the present invention from those of my aforesaid copending applications may be employed in practicing any of the several embodiments of process and apparatus set forth in said applications.

In all of such embodiments, while the emulsification and homogenization under ideal conditions can produce an aqueous emulsion having substantially all of its dispersed particles of precursor latex particle size; considerations of economy, storage, or other factors, may result intentionally or unintentionally in the production of a fine emulsion that, while principally comprising dispersed particles of precursor latex particle size which on removal of solvent therefrom yield latex particles in the colloidal size range, may contain a smaller proportion of particles of greater than precursor latex particle size. Such particles when relieved of their solvent and included in the latex product, do not appear to have much effect on the shelf life or storage stability of the latex, but do seem to act as initiators of coagulation when the latices containing them are subjected to mechanical working.

Accordingly, it is highly desirable that latices for uses in which they will be subjected to mechanical working be essentially free of such non-colloidal sized particles, and that such essential freedom be evidenced by the ability of the latex to pass a standardized mechanical stability test. Any of several such standardized tests may be employed, but the test preferred and referred to in the present specification is made as follows:

a. A 50 gram sample of 20% solids latex is placed in a 300 ml tall form beaker (Pyrex No. 1040) and agitated for 30 minutes with a Hamilton Beach (trade name) mixer (Model No. 930).

b. The so agitated latex is then poured through a 200 mesh stainless steel screen and any retained coagulum is washed with water, dried at 105° C and weighted.

c. A mechanically stable latex should yield by this test less than 5% of its solid content as coagulum, and preferably essentially no coagulum.

One of the improvements of the present invention affords a method and means for insuring the production of such mechanically stable latices from aqueous emulsions of solvent polymer cements notwithstanding less than ideal preparation of the initial aqueous emulsion of solvent polymer solution, by a treatment which differentiates the susceptibility of the colloidal sized and non-colloidal sized resulting particles to heat, and then applies heat and mechanical treatment thereto in a manner to selectively coagulate the particles of greater than colloidal size without coagulating the colloidal sized particles, so that the latex will be essentially free of particles detrimental to its mechanical stability.

Another improvement of the present invention provides for recovery and reuse of the so selectively agglomerated and removed polymer coagulum.

Another improvement of the present invention resides in the adaptation of the first improvement just discussed for treating latices prepared from emulsions of solvent polymer solutions and having poor mechanical stability, to improve the mechanical stability thereof as measured by the aforesaid test.

Another improvement of the present invention resides in the provision of apparatus for facilitating the practice of the aforesaid process improvements.

In a first embodiment of the invention the formation of a latex from an organic solvent dispersion of a composition of an organic solvent soluble or dispersible polymer is effected by a process of the type which comprises:

1. providing a dispersion of the polymer composition, preferably one having a dry solids content within the range of 8 to 50% by weight, in an essentially water-immiscible volatile solvent which itself or as an azeotrope with water has a boiling point lower than that of water at atmospheric pressure,
2. adding water and emulsifier to said dispersion in proportions to form an emulsion having water as its continuum and emulsifying the same so that the discontinuous phase thereof is in particles at least principally of precursor latex particle size, such proportions preferably being in the range of 0.4 to 20% emulsifier by weight based on the cement, and 0.4 to 2.5 parts by volume of water per part of cement,
3. stripping the solvent from the emulsion to form a latex, and
4. recovering the latex product, and which comprises the further steps of:

5. providing a moving flow of gas comprising steam as an initial continuous phase,
6. dispersing the said emulsion into the flow of steam as the initial continuous phase while subjecting the phases to a decrease of pressure and maintaining the temperature thereof below the limiting temperature for stability of the emulsion of particles of precursor latex particle size, thereby vaporizing solvent from the dispersed droplets and forming latex and vapor, and in this embodiment mechanical stability of the latex is assured by the combination in the process of the further steps of:

7. subjecting the latex prepared by step (6) to an increase in temperature for a period of time only sufficient to destabilize, and permit coagulation from the latex of, particles of greater than colloidal size that may be present therein without such time period being sufficiently long to substantially effect coagulation of the latex particles of colloidal size, and
8. separating from the latex any coagulum formed.

In particular species of this first embodiment: step (7) may be practiced by passing the latex formed in step (6) in contact with a surface heated in the range of 212° to 260° F., preferably 225° to 245° F., for a sufficient time to effect the destabilization of such particles of greater than colloidal size, and this practice may be carried out in the presence of solvent vapor produced in step (6). In other species of this first embodiment, step (7) may be practiced by bringing into contact with the latex formed in step (6) a quantity of steam sufficient in amount and temperature to effect the selective destabilization of such particles of greater than colloidal size, and this practice may also be carried out in the presence of solvent vapor produced in step (6), as by introducing such quantities of steam into the aerosol of latex droplets and vapor continuum formed in step (6) at a zone downstream from the zone of dispersion of the emulsion into the first flow of steam as the initial continuous phase. And in the several species of this first embodiment, the process preferably further includes the step of recycling the coagulum separated in step (8) to form part of the material employed in forming the emulsion in step (2), and preferably in this step the coagulated polymer is dissolved in solvent the same as that used in step (1) and the resulting solution is employed to form a part of the solvent dispersion of polymer composition produced in step (1). Also, in the several species of this first embodiment step (4) is preferably practiced by establishing a separating zone maintained at sub-atmospheric pressure, establishing a flow of latex through said separating zone, introducing into said separating zone the latex droplets and vapor produced by step (6) and impinging said droplets upon the flow of latex therein, withdrawing vapor from said separating zone, and withdrawing the combined latices from said separating zone, with or without other cooperating steps hereinafter disclosed, or disclosed in the aforesaid copending applications, e. g., when a very fine latex is being produced, and being augmented in particle size by grafting as in 27 herein (or by treating in an orifice type homogenizer as described in my copending application Ser. No. 767,790 (now U.S. Pat. No. 3,622,127) in connection with elements 26, 326, and 1226 therein) the selective coagulation of particles of greater than colloidal size from the latex may be facilitated by forming such very fine latex, and in turn the removal of the larger than colloidal size particles from the very fine latex contributes to the production from the latter of a more uniform latex of augmented particle size.

In a second embodiment, the process aspect of the invention is applied for separating non-colloidal sized particles of polymeric material from an aqueous latex of colloidal sized particles of such polymeric material, by practicing the following steps:

1. diluting the latex with water, if needed, and from 0 to 50% by weight based on the polymer of a solvent imbibable in said polymeric material, said solvent being a water immiscible volatile organic solvent which itself, or as an azeotrope with water, has a boiling point lower than water at atmospheric pressure,
2. providing a moving flow of gas comprising steam as an initial continuous phase, and thereafter,
3. subjecting the mixture prepared in step (1) to dispersion in said initial continuous phase and to further treatment as described in steps (6) and following of the first embodiment described above, which further treatment steps may be practiced in accordance with any of the species of said first embodiment described above or hereinafter disclosed.

And in addition to the above process improvements the invention provides new apparatus combinations permitting continuous operation of the above processes, or of processes disclosed in the aforesaid copending application.

Thus, objects of the invention, severally and interdependently, are to provide new apparatus features and new combinations of steps, which enable the production of improved latices. Other objects and advantages of the invention will be apparent from the above general description and the following more particular descriptions of preferred embodiments thereof, which, however, are illustrative but not restrictive of the invention, the scope of which is more particularly pointed out in the appended claims.

By the term "latex" as used herein is meant an aqueous suspension of colloidal polymer particles and emulsifier material and the polymer thereof may be selected from the following types and combinations thereof:
 i. homopolymer,
 ii. interpolymer including block and graft polymer,
 iii. hydrocarbon polymer,
 iv. polar polymer,
 v. polymer composition comprising polymer material selected from (i) through (iv) above and compounding ingredients including reinforcing fillers and/or non-reinforcing fillers.

By the term "colloidal particle" or "colloid" as used herein is meant particles in the size range of 500 A to 10,000 A diameter, and by the term upper portion of the colloidal size range is meant particles in the size range of above 2,000 A, preferably 3,000 to 5,000 A, diameter.

By the term "precursor latex particle size" is meant a particle of polymer composition and solvent of such a size that when relieved of its solvent content the resulting particle is a colloidal particle as above defined.

By the term "greater than precursor latex particle size" is meant a particle of polymer composition and solvent which when relieved of its solvent yields particles of greater than colloidal size, which reduce the mechanical stability of the latex. Such particles are usually from 10 to 1,000 times as large as particles of precursor latex particle size.

By "natural resin" as used herein is meant those inflammable amorphous vegetable products of secretion or disintegration usually formed in special cavities of plants and such resins are generally insoluble in water and soluble in alcohol, fusible and of concoidal fracture and are usually oxidation or polymerization products of terpenes.

By the term "synthetic resin" as used herein is meant organic oxidation, polymerization or condensation products not produced in nature but produced synthetically and having resin-like properties and which term does not include the synthetic rubbers. Synthetic resins include (1) the resinous polymers produced from unsaturated petroleum compounds by oxidation and/or polymerization such as resinous alpha-olefin polymers, (2) condensation resins such as the phenolic resins, the aminoplast resins, alkyd resins, glycerol-phthalate resins and the like; (3) the non-rubber-like resinous polymers produced by cyclizing, hydrogenating or halogenating unsaturated rubber polymers such as cyclized polyisoprene, chlorinated polyisoprene and the like, (4) resins derived from coal tar chemicals such as the cumarone-indene resins; (5) resinous materials prepared from vinyl, vinylidene and vinylene monomers; (6) resinous copolymers prepared from vinyl, vinylidene and vinylene monomers with conjugated diene monomers such as the high styrene-butadiene resins; (7) resinous copolymers prepared from vinyl, vinylidene, and vinylene monomers and alpha-olifins such as the ethylene-vinyl acetate copolymers. As used herein the terms "synthetic resins" is restricted to those synthetic resins which are soluble in at least one solvent essentially water immiscible and which itself or as its azeotrope with water has a boiling point lower than that of water at atmospheric pressure.

By the term "polymer composition" is meant elastomers and other high polymers (molecular weights $10^3$ to $10^6$) and/or lower polymers (500–1000 molecular weight) and said term polymer composition encompases polymer materials, grafted or ungrafted including the synthetic resins and natural resins.

In practicing the present invention conditions are created combinations of which render practical the production of aqueous latices from solvent dispersions of high polymer compositions. These conditions, inter alia, include, severally and in cooperating combinations:

1. The use of particular solvents for the polymers which are essentially immiscible with water in liquid phase, and which have boiling points less than the boiling point of water at atmospheric pressure, or which form azeotropes with water which have boiling points less than the boiling point of water at atmospheric pressure. Such solvents include the $C_3$ to $C_7$ acyclic hydrocarbon solvents, cyclohexane and methylcyclohexane, the $C_6$ to $C_9$ aromatic hydrocarbon solvents, and the less desirable halo-substituted $C_1$ to $C_5$ hydrocarbon solvents when required and combination of two or more members of the foregoing groups. Preferred are such solvents which have boiling points higher than that of water but which form azeotropes with water that have boiling points lower than that of water, which preferred group comprises especially the aromatic solvents including toluene, the xylenes, ethyl benzene, cumene, etc.

2. The formation of relatively high solids cements of the polymer composition and the solvent therefor selected as aforesaid, which cements preferably have viscosities of over 1000 centipoises and more preferably over 7,000 to 10,000 centipoises, and even over 10,000 to 20,000 centipoises, which high viscosities can be tolerated because of other cooperating steps of the process. The cements of emulsifiable viscosities in the preferred range of 7,000 to 10,000 centipoises generally comprise by weight at least 25% and preferably over 50% of solvent, depending on the polymer to which the invention is applied.

BRIEF DESCRIPTION OF THE DRAWING

In the accompanying drawings:

FIGS. 1A and 3A are respectively a flow sheet or diagram of a portion of a complete process, and a diagrammatic plan view of a portion of an apparatus, embracing the present improvement; and FIGS. 1–16 illustrate more generally the process steps and apparatus features which cooperate with said specific improvements and to the embodiment thereof in a complete process and apparatus for producing latex from an emulsion of solvent polymer cement; and in FIGS. 1–16:

FIG. 1 is a flow sheet or diagram illustrating the sequences of steps and flow of material in typical embodiments of process.

FIG. 2 is a diagram of a preferred form of equipment for preparing the emulsion, corresponding to portions 7–13 of FIG. 1, the corresponding elements having the same numerals raised by 100, and respective parts thereof being designated by modifying letters.

FIG. 3 is a similar diagram of a preferred form of device for dispersing the emulsion of solvent/polymer cement into the steam flow, and segregating and separating the latex phase from the vapor phase, and further treating the latex phase, corresponding to portions 14 and following of FIG. 1.

FIG. 4 is a more or less diagrammatic elevation partly cut away of a preferred embodiment of the portion 14 of FIG. 1.

FIG. 5 is a more or less diagrammatic elevation, partly cut away, of a preferred form of separator corresponding to portion 16 of FIG. 1.

FIG. 6 is a more or less diagrammatic horizontal cross-section taken on line VI—VI of FIG. 5.

FIG. 7 is a more less diagrammatic elevation partly cut away of a preferred arrangement comprising a solvent-cement aqueous emulsion homogenizer delivering its output directly to an aerosol generator.

FIGS. 8 to 11 are diagrammatic flow sheets indicating modes of admixing partially concentrated latex, with or without water vapor evolved therefrom, with the gaseous and liquid phase from the aerosol generator, for aiding in the segregation and separation thereof.

FIGS. 12 to 15 are vertical elevations partly cut away of types of mixer nozzles or in line mixers employable as aerosol generators and/or mixers in the practice of the invention, e.g. in FIGS. 8 to 11.

FIG. 16 is a more or less diagrammatic elevation of another embodiment.

Figure 1A:
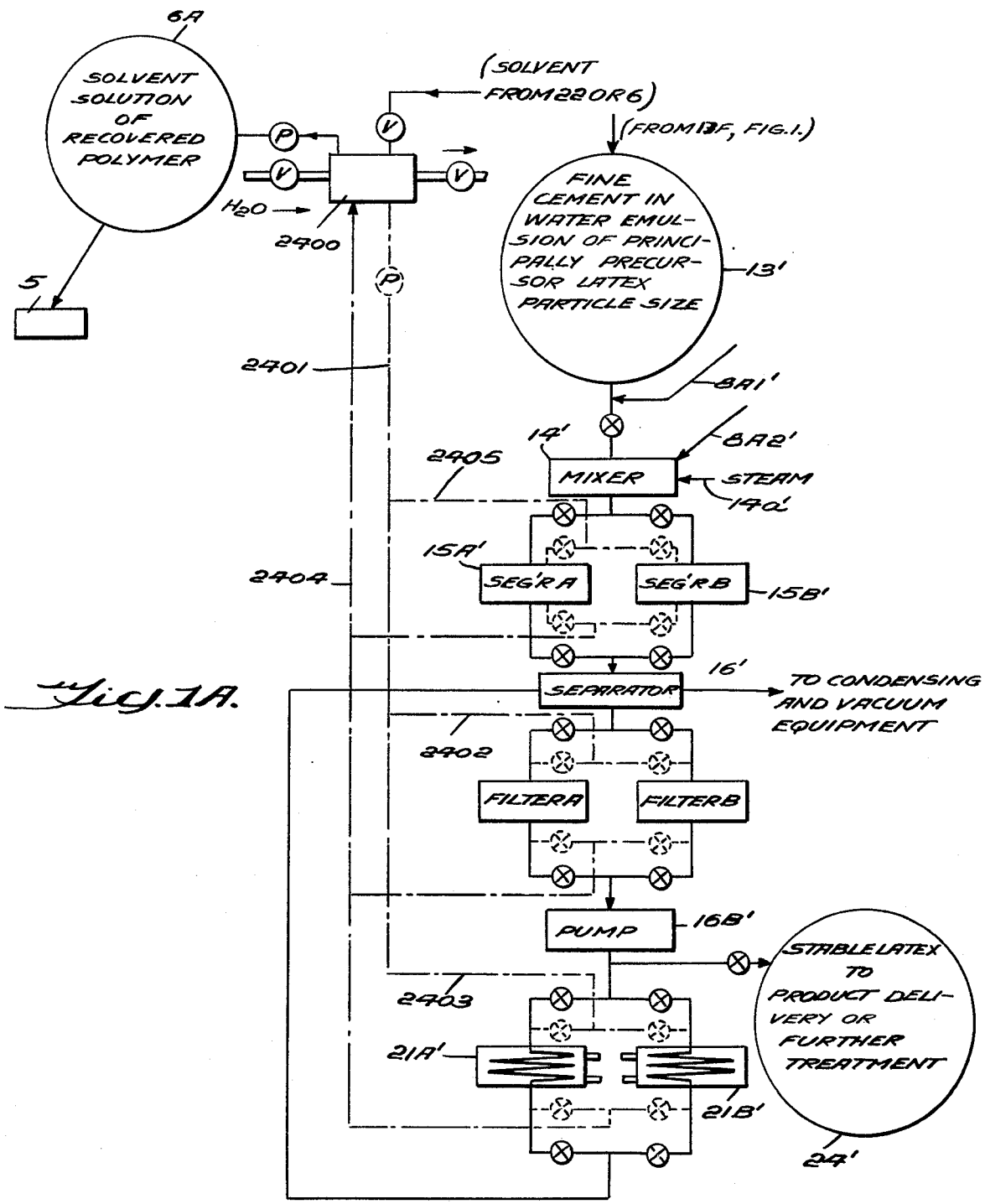

DESCRIPTION OF PREFERRED EMBODIMENTS a. In General

The particular improvements hereinafter described in connection with FIGS. 1A and 3A pertain to improvements in overall processes and apparatus for producing latices, and are particularly cooperative with preferred embodiments thereof.

In such preferred embodiments as illustrated in FIG. 1, the high polymer 1, e.g. elastomer and/or plastomer material as hereinafter described, is prepared as a high polymer composition 4 for conversion to a cement, as by working in appropriate masticating, comminuting, or attenuating equipment 2, such as a rubber mill, Banbury, comminutor, extruder, or the like. In accordance with the aforesaid applications provision may be made for incorporating one or more known polymer compounding ingredients 3, e.g. rubber reinforcing filler, into the said polymer composition in such a way that the ingredients 3 are thereafter contained within the polymer particles of the latex being formed, for which purpose the said ingredient or ingredients 3 may be worked into the high polymer 1 by working therewith in the masticating equipment 2, providing such polymer composition will, when dispersed in a suitable solvent for the polymer and with the aid of an emulsifying agent and adequate emulsifying equipment, produce an aqueous dispersion that is essentially of precursor latex particle size. By such procedure the said polymer ingredients may become fixed to the compounding ingredient, i.e. the polymer particles can become reinforced by the fillers, and in effect become so intimately attached thereto, or embrasive thereof, as to retain the same when dispersed as a cement. In the case of compounding ingredients desired to be incorporated in the latex particles, but not requiring working with the polymer itself, such ingredients 3 may be fed into the cement forming equipment or dissolver 5 independently of the said polymer composition 4, as is also indicated in FIG. 1.

In the cement forming equipment or mixer or dissolver 5 which may also comprise a disperser, the high polymer composition 4 is combined and preferably stirred or otherwise worked with solvent 6 appropriate for the high polymer and for the process, as further described herein, to form a solvent cement 7 of the high polymer composition 4 and of any extraneously added compounding ingredients 3, the adequate dispersion of which in the cement may require vigorous working, which may even be accomplished by the passage of the cement through a suitable dispersing equipment 7a.

The solvent/polymer cement 7 is then combined with emulsifier 8 appropriate for the high polymer and the process, and with water 9 in a course emulsion mixing equipment 10 where the ingredients are mixed, preferably with the aid of heat, to form a course cement in water emulsion 11, which is then passed one or more times through an ultradispersing equipment 12, preferably of the type hereinafter described, which breaks up the relatively large particles of solvent-cement forming the discontinuous phase in the course emulsion 11 into particles principally of precursor latex size, i.e. which will be of latex particle size when relieved of their solvent content, and preferably in the upper portion of the colloidal size range.

As in my aforesaid applications the course cement-in-water emulsion 11 may be passed one or more times, usually 6 to 12 times, through one or more so-called ultradispersers 12 e.g. the "Moulds" type more fully described hereinafter, in order to accomplish a sufficient reduction of latex particle size. The resulting fine emulsions have rather wide ranges of cement droplet size distribution and adjusted if necessary to an appropriate temperature, as by the cooler 13A, by-pass 13B and/or heater 13C, may be fed by suitable positive displacement, e.g. plunger, pump means 13D, to a homogenizer 13E, preferably of the vibrating blade type operating at 300 p.s.i. inlet and 30 p.s.i. outlet or of the resiliently restricted orifice type operating at pressures in the range of 1,000 to 10,000 p.s.i., for reducing the particle size distribution of the fine emulsion. The resulting emulsion 13 of reduced particle size distribution or without cooling by a cooler 13F is preferably delivered directly to a steam mixer or aerosol generator 14 where it is dispersed into a flow of steam as hereinafter described. As indicated in FIG. 1 the emulsifier material 8 may be formed into an aqueous emulsifier solution 8' with water 9' saturated with solvent or with water 9'' from an extraneous source.

The resulting fine cement-in-water emulsion 13, in accordance with my aforesaid applications may be an unstable emulsion of only temporarily precursor latex size particles, and may be either stabilized as by adding further treatment or may be immediately converted into an aerosol, of which the dispersed phase may comprise colloidal and larger sized droplets in a steam/solvent vapor continuum, thus minimizing agglomeration of polymer-solvent particles into greater than precursor latex particle size, and is therein stripped of its solvent content. In such aerosol form the stripping is accomplished without excessive foaming and while avoiding or minimizing formation of coagulum, desiderata which cannot be attained when any substantial proportion of solvent is attempted to be removed from an aqueous emulsion of high polymer solvent cement in other than an aerosol condition. As in the aforesaid applications, the formation of the aerosol is preferably accomplished by providing a flow of steam 14a as an initial continuous phase and introducing the aqueous emulsion of at least temporarily precursor latex sized particles 13 as a discontinuous phase into the flow of steam as the initial continuous phase in a mixer or aerosol generator 14, whereby volatile solvent 6 is vaporized to become the continuous phase or the principal part thereof, and a corresponding amount of steam is condensed to supply the heat of vaporization for the solvent and become added as water to the discontinuous phase. As explained in connection with FIGS. 3 and 4, in certain embodiments of the process a part only of the steam may be supplied at a first station where the emulsion of polymer/solvent solution is introduced, and the remainder of the steam may be introduced at one or more stations down-stream from said first station. As the phase transition is accomplished the resulting gaseous and nongaseous phases are usually in a form resembling an aerosol and the aerosol droplets are then coalesced to form a latex separable from the vapor phase. Even when the emulsion has been prepared with only a limited quantity of emulsifier and has its dispersed phase only temporarily of precursor latex particle size, the latex produced by the phase transition in the aerosol may be sufficiently stable for coalescence or even for concentration. When these conditions do not pertain liquid emulsifier or liquid emulsifier solution may be added to the aerosol produced in the aerosol generator 14, as at 8A2.

The coalescing step may be practiced by passing the gaseous and non-gaseous phases through a coalescing means 15 in the form of a segregator or coalescer while maintaining the temperatures of the flows within the limited range for stability of the latex, and the coalesced droplets, now definitely of greater than aerosol size, are collected in the form of a bulk latex from the gaseous continuous phase. As is more fully described in connection with FIG. 3, in certain embodiments of the present invention, the coalescing is accomplished by subjecting the aerosol, on its way to a reduced pressure separator 16, to the action of centrifugal force for effecting segregation or coalescence of the nongaseous phase, as by passing the gas and latex phases of the aerosol through a centrifugal pump, and preferably a centrifugal pump having the type of pump rotor, pump chamber and inlet and outlet means illustrated in U.S. Pat. No. 3,324,798. As is also more fully described in connection with FIG. 3, in lieu of the centrifugal segregator, other types may be employed, e.g. a plate-type tortuous path segregator or an axial impact phase segregator. The final separation or collection may be attained by delivering the flows from the segregator 15 into a separator or collector 16, from the lower part of which the latex is drawn, and from an upper parat of which the continuous phase is passed to condensing equipment 17 maintained under vacuum, preferably a vacuum of the order of 28 to 29 inches of mercury, by withdrawal of uncondensed gases therefrom by vacuum pumping equipment 18, e.g. a steam jet, and the separator or collector 16 may be of various forms and may even be incorporated with a segregator 15 as is described in said copending application Ser. No. 691,823.

Still referring to FIG. 1, the high polymer composition latex 19 withdrawn from the separator 16 may be in part delivered as product 24, and is recycled as indicated at 21, that is it may be cycled through a different or the same heater and separator 21 and 16 for concentrating the latex, in which event the latex is heated to evaporate water therefrom under sub-atmospheric pressure at temperatures within the limited temperature range for its stability, and in accordance with the present improvements (FIGS. 1A and 3A) said circulation of latex may be passed in contact with a surface heated in the range of 212° to 260° F. for a sufficient time to destabilize and coagulate of greater than colloidal size, but not so long as to coagulate and remove any substantial proportion of the latex sized particles, by heating fluid passing externally to its flow path in 21 from the valved heat sources shown connected to 21. When such concentrating step has been employed, the product 24 resulting therefrom will be a latex of increased solids content.

As in my application Ser. No. 784,596 (now U.S. Pat. No. 3,622,127), various provisions may be employed for modifying the latex 20. These provisions are illustrated at 24 and following in FIG. 1 herein. Thus, in these embodiments of the process, the latex of intermediate solids content may be mixed in a hold tank, mixer, or proportionate feeder 24 with polymerization catalyst 24a and monomer material 24b, and after appropriate adjustment of its temperature, as by a heat exchanger means 25, may be passed to polymerization reaction means 27. The modified polymer latex delivered by the reactor with or without added emulsifier 84A may be delivered to storage 29, preferably through a cooler 28, pending delivery as by a pump 30 for further treatment in heating and separating apparatus 31 and 32, which may be of the type shown at 1220 and 1216F in FIG. 3, hereinafter described. In this further treatment residual solvent, odors, and unreacted monomers, if any, may be removed, and if desired the latex may be further concentrated. The modified latex from separator 32, which in each event will have, along with other modifications, a higher solids content than the latex 20, may be passed by a pump 34 to product storage 36, preferably through a cooler 35.

In certain embodiments of the process, the operations up to point 24 may be conducted to form latex of low molecular weight polymer, which enables a latex of higher solids content to be employed without having to deal with excessively high viscosity, and monomer 24b and catalyst 24a, and temperature in the apparatus 27 may be employed in such quantities and degree as to materially augment the molecular weight of the polymer, and especially when it is desired to highly augment such molecular weight, polymer cross-linking agent 24c may be added in the mixer 24, for intimate association and reaction in the apparatus 27.

The final stripping, deodorizing, and/or concentrating in separator 32 is preferably effected as shown with the aid of condensing equipment 37 and vacuum pumping apparatus 38, and when such equipment produces a yield of recoverable fluid, e.g. pure water, such may be returned for reuse, e.g. to the water supply 9, as shown. Where prolonged shelf life is deisred, additional emulsifier may be added to the latex from 8A5, preferably ahead of the pump 34.

In a still further embodiment of the invention, exemplified in FIG. 3, the stripped latex 324 having been substantially freed of particles of greater than colloidal size but still containing residual solvent, is subjected to concentration, deodorizing, and stripping of residual solvent in a heating apparatus 1220 and separator 1216, and is then, as a finished high solids latex, subjected to heating to an appropriate temperature at 1225, and further treatment with polymerization catalyst 1224a and monomer material 1224b and/or cross-linking agent 1224c for effecting grafting or cross-linking of the polymer molecules contained in the particles of the finished latex. When necessary after this treatment, the grafted or cross-linked latex may be stripped of residual volatiles and odor, as by passing it through a stripper-deodorizer-concentrator circuit, which may be the same circuit 1220–1216 isolated for this purpose as by opening valves 1227a and 1229 and closing valves 1228 and 1231. Delivery of the treated latex to storage 1233 is preferably effected after cooling in a heat-exchanger 1232, by appropriate adjustment of the valves 1227a–1231.

b. The Polymer Material 1

The new process is applicable to the preparation of latices from solvent solutions or dispersions of polymer materials which are essentially solvent soluble or dispersable and essentially water insoluble, including natural rubber and polymers of one or more ethylenically unsaturated monomers containing from 2 to 20 carbon atoms, preferably from 2 to 10 carbon atoms. It is especially applicable to those elastomers and plastomers which, with or without plasticiser, have the foregoing properties and properties adapting their latices for use as adhesives, binders, film forming materials, coating materials, etc. Examples of such elastomers and plastomers, illustrative but not restrictive of those to which the invention can be applied, are as follows: butyl rubber, chlorinated butyl rubber, polyisobutylene, polybutadiene, polyisoprene, polyethylene, polypropylene (including both amorphous and/or crystalline polypropylene), ethylene-propylene polymer, ethylene-propylene-diene terpolymer, ethylene-vinylidene monomer interpolymers (including ethylene-vinyl acetate copolymers), butadiene-ethylene copolymers, propylene-butene-1 copolymers, butadiene-styrene copolymer, nitrile rubber (including butadiene-acrylonitrile and butadiene-methacrylonitrile copolymers), natural rubber, hydrocarbon resins, any of the foregoing polymers grafted with polar or other polymer grafts, as for example, those set forth in British Pat. No. 878,150 to Burke, published Sept. 27, 1961, and solvent soluble mixed plastomers and elastomers, e. g. butadiene-styrene-terpolymers with styrene copolymer resins including graft polymers thereof, as for example, those set forth in Hayes U.S. Pat. No. 2,802,808. Particularly included are those polymers which are prepared in essentially water immiscible organic liquid, or under essentially anhydrous conditions, from unsaturated monomers having 2 to 20 carbon atoms. Thus, "polymer material" includes graft polymer material, and said polymer material may be grafted, per se, or as a solvent solution or dispersion with monomer material including the monomer material set forth under (e) hereinafter, with the aid of a catalyst including the free radical generating catalysts set forth under (f) hereinafter.

c. Compounding Ingredients 3, 3a, 1223a.

The compounding ingredients which are especially contemplated in the present invention are the solid, particulate, compounding ingredients which are insoluble in the solvents 6, namely: fillers, including rubber reinforcing fillers, pigments, etc., which by the present invention may be incorporated into the polymer composition particles of the latices, rather than merely in the water phases thereof. The solid particulate compounding ingredients of this class comprise those set forth on pages 278 to 345 of "Compounding Ingredients for Rubber" 3rd Edition (1961) published by Rubber World, New York, N. Y., herein incorporated by reference, and on pages 146 to 217 of "British Compounding Ingredients for Rubber" by Brian J. Wilson (1958) published by W. Heffer & Sons, Ltd., Cambridge, England, herein incorporated by reference. These ingredients thus include but are not limited to carbon black, talc, mica, lithopone, aluminum silicate, calcium silicate, silica, calcium carbonate, calcium sulfate, asbestos, organic pigments, inorganic pigments, and insoluble organic fillers including vinylic fillers and vinylic pigments. The insoluble organic fillers are described in British Pat. No. 799,043 to Burke published July 30, 1958 and in chapter 15 entitled "Reinforcement of Rubber by Organic Fillers" in the treatise "Reinforcement of Elastomers" edited by Gerard Kraus (1965) published by International Publishers, New York, N.Y., herein incorporated by reference.

d. The Emulsifiers 8

The invention in its broader aspects is not dependent on the use of any particular emulsifier or combination of emulsifiers, and may be practiced with any selected emulsifier or emulsifier combination suitable for aqueously emulsifying the non-aqueous solvent solutions or dispersions of the polymer materials concerned, for which purpose the emulsifier or combination of emulsifiers must be water soluble or water dispersible. Emulsifiers capable of forming stable aqueous emulsions with polymers may be selected from the following subgroups:

a. One or more anionic emulsifiers.
b. One or more cationic emulsifiers.
c. One or more nonionic emulsifiers.
d. Combinations of anionic and nonionic emulsifiers.
e. Combinations of cationic and nonionic emulsifiers.

The anionic, cationic and nonionic emulsifiers which are water soluble usually contain from 8 to 22 carbon atoms, when non-polymeric, but such limitation does not apply to those which are polymeric, where water solubility or dispersability is the criterion. The polymeric emulsifiers are best employed in conjunction with non-polymeric emulsifiers.

Emulsifiers of the anionic, cationic, and nonionic types including in some instances those in polymeric forms are set forth in "Detergents and Emulsifiers 1967 Annual" by John W. McCutcheon, published by John W. McCutcheon, Inc., Morristown, N. J., and especially those listed therein under the headings of emulsifiers suitable for emulsion polymerization or suitable for the emulsification of polymer material, or suitable for the emulsification of hydrocarbons including hydrocarbon waxes, may be used in practicing the present invention. The use of about 5–20 percent by weight of emulsifier material based on the polymer composition content of the polymer-solvent cement in practically all instances suffices and in most instances 5 to 6 or less percent by weight of emulsifier based on polymer composition content of the cement is sufficient, because the present process minimizes the amount of emulsifier required.

The anionic emulsifiers include but are not limited to emulsifiers which are alkali metal salts of fatty acids, partially hydrogenated fatty acids, rosin acids, disproportionated rosin acids, alkyl sulfates, aryl and alkaryl sulfonates, and water soluble and dispersable emulsifiers having the general formula: $R(OCH_2CH_2)_nOSO_3X$ wherein R is an aliphatic, aryl, alkaryl or cyclic radical, $n$ is 1 to 9, and X is a monovalent alkali metal or ammonium radical.

Typical anionic emulsifiers are set forth in Table A.

TABLE A

Typical Anionic Emulsifiers

| | Salt | Acid or Acid Radical | Trade Name |
|---|---|---|---|
| 1 | Potassium | hydroabietic and dehydroabietic | Dresinate 731 |
| 2 | Potassium | disproportionated tall oil resin | Indusoil JC-11B |
| 3 | Sodium | hydrogenated tallow fatty acids | Armeen HT |
| 4 | Sodium | lauryl sulfate | Sipex UB Dupanol WAQ |
| 5 | Sodium | tallow sulfate | Conco Sulfate T |
| 6 | Ammonium | mononaphthalene sulfonic acid | Lomar PWA |
| 7 | Sodium | dodecylbenzene sulfate | Santomerse 85B |
| 8 | Sodium | polymerized alkyl naphthalene sulfonic acid | Daxad 15 Daxad 23 |
| 9 | Sodium | alkyl aryl sulfonate | Nacconol 90F Suframin OBS |
| 10 | Sodium | alkylnaphthalene sulfonate | Nekal BA-75 |
| 11 | Sodium | N-cyclohexyl-N-palmitoyl-taurate | Igepon CN-42 |
| 12 | Sodium | lauryl ether sulfate | Sipon ES |
| 13 | Sodium | alkylaryl polyether sulfate | Triton W-30 |
| 14 | Sodium | sulfate ester of nonylphenoxypoly (ethyleneoxy) ethanol | Alipal CO-433 |
| 15 | Ammonium | sulfate ester of nonylphenoxypoly (ethyleneoxy) ethanol | Alipal CO-436 |
| 16 | Sodium | naphthalene sulfonic acid | Nacconol NRSF |
| 17 | Sodium | dioctyl ester of sulfosuccinic acid | Aerosol OT |
| 18 | Sodium | saponified poly(methylvinylether/maleic anhydride) | Gantex AN-139 |
| 19 | Sodium | saponified poly-(styrene/maleic anhydride) | Lytron SMA-3000A |

The cationic emulsifiers include, but are not limited to, the class of emulsifiers which are acid salts of primary, secondary, and tertiary amines and the quaternary ammonium type emulsifiers. Typical cationic emulsifiers (used with acids to form water soluble salts when not quaternary ammonium compounds) are set forth in Table B.

TABLE B

Typical Cationic Emulsifiers

| | Emulsifier Base | Trade Name |
|---|---|---|
| 1 | Cocoamine | Armeen C |
| 2 | Stearylamine | Armeen T |
| 3 | N-alkyl trimethylene diamines (alkyl groups derived from cocoanut, soya, and tallow fatty acids) | Duomeen C Duomeen T |
| 4 | Primary fatty amine ethyelen | Priminox T-25 |

TABLE B-Continued

Typical Cationic Emulsifiers

| | Emulsifier Base | Trade Name |
|---|---|---|
| | oxide reaction products, e.g. $RNH(CH_2OH_2O)_{25}H$ | |
| 5 | Polyoxyethylated alkylamine | Katapol PN-430 |
| 6 | Ethylene oxide condensates with primary fatty amines | Ethomeens |
| 7 | bis(2-hydroxyethyl)cocamine oxide | Armox C/12W |
| 8 | bis(2-hydroxyethyl)tallow amine oxide | Armox T/12 |
| 9 | Amine and quaternary ammonium compounds suitable as asphalt emulsifiers | Redicote series e.g. Redicote E-4, E-5, E-9, E-12 and E-N. |
| 10 | $C_{18}H_{37}N(CH_3)_2ClC_3H_6N(CH_3)_3Cl$ | Redicote E-11 |
| 11 | di-isobutyl phenoxy ethoxy ethyl dimethyl ammonium chloride | Hyamine 1622 |
| 12 | N-alkyl trimethylammonium chloride (alkyl=coco or steryl radical) | Arquads |
| 13 | polyvinylpyrrolidone | PVP |

Non-ionic emulsifiers can be selected from the class of emulsifiers which are alkyl polyoxyethylene ethers and alcohols, or polyethylene ethers and alcohols. Other non-ionic emulsifiers include those which are polyoxyalkenated alkyl phenols or alcohols having the formula $R(OCHR_1CHR_1)_nOH$ where R is an alkyl, aryl or alkaryl group, $R_1$ is an alkyl group or hydrogen and $n$ is an integer of 4 to 10 or even higher. Compounds of this type are prepared by condensing an alkyl phenol or an alcohol with ethylene oxide or propylene oxide. Typical nonionic emulsifiers are set forth in Table C.

TABLE C

Typical nonionic Emulsifiers

| | Chemical Name | Trade Name |
|---|---|---|
| 1. | Nonylphenoxypoly(ethyleneoxy)-ethanol | Igepal CO-970 |
| 2. | nonylphenyl polyethylene glycol ether | Tergitol TP-9 |
| 3. | polyethyleneglycol fatty ester | Modecol L. |
| 4. | coconut alkanolamide | Monamine AA-100 |
| 5. | polyethyleneglycol 400 monolaurate | Pegmol-5942 |
| 6. | propylenglycol monolaurate | — |
| 7. | castordiethanolamide | Emid-6547 |
| 8. | ethylene oxide condensate with primary fatty amides | Ethomids |
| 9. | fatty alcohol polyglycolether | Lorox |
| 10. | sorbitolsesquioleate | Nonion OP-83 |
| 11. | polyoxyethylene lauryl ether | Brij-35 |
| 12. | polyoxyethylene lauryl alcohol | Igepal-430 |
| 13. | polyetherated fatty alcohols | Emulphor-CN Emulphor-CN-870 |
| 14. | polyoxyethylated octyl phenol having 8 to 10 ethylene oxide units | Triton X-100 |

The Polymeric Emulsifiers include the water dispersible polyelectrolytes set forth in Hedrick and Mowry's U.S. Pat. No. 2,625,529 relating to "Methods of Conditioning Soils." In said patent are listed a number of water-soluble polyelectrolytes and these materials are defined as "synthetic water soluble polyelectrolytes having a weight average molecular weight of at least 10,000 and having a structure derived by the polymerization of at least one monoolefinic compound through the aliphatic unsaturated group and substantially free of cross-linking." The present invention has shown that these synthetic water soluble polyelectrolytes can be employed as emulsifiers for the preparation of latices as herein set forth. The disclosed polyelectrolytes of this patent are therefor incorporated herein by reference, it being noted however that the lower limit of molecular weight prescribed by the patentee does not apply, the applicable criterion being that the materials are water soluble or water dispersible emulsifiers.

Combinations of emulsifiers. The present invention has disclosed that by using certain combinations of emulsifiers, it becomes possible to prepare a stable latex from aliphatic hydrocarbon polymers dissolved in hydrocarbon solvents and even in aromatic solvents, as is desirable under certain processing conditions. An effective emulsifier combination for aqueously emulsifying 100 parts by weight of a hydrocarbon rubber dissolved in from about 300 to 600 parts of an aromatic hydrocarbon solvent such as toluene, may comprise 10 parts by weight of a nonionic emulsifier, e. g. polyoxyethylated octyl phenol such as Triton X-100, a trade mark product and 1 part by weight of an anionic emulsifier, e.g. sodium lauryl sulfate.

Another effective emulsifier combination for 100 parts by weight of hydrocarbon rubber dissolved in about 400 parts of aromatic solvent such as toluene combines 3 parts by weight of the aryl anionic emulsifier, sodium salt of an alkaryl polyether sulfate e. g. Triton W-30 (a trade mark product) and 3 parts by weight of the non-aryl anionic emulsifier sodium lauryl sulfate e. g. Dupanol WAQ (a trade mark product).

It has for some time been a desideratum in the art to have a stable hydrocarbon rubber latex suitable for combination with asphalt or asphalt emulsions, for road surfacing and roofing purposes, for example. Application Ser. No. 691,823 replaced by application Ser. No. 70,949 now U.S. Pat. No. 3,652,482, has disclosed that latices of hydrocarbon rubber such as butyl rubber, polyisobutylene, ethylene-propylene rubber or rubbery amorphous polypropylene, which are suitable for such use, can be prepared by employing as emulsifier for the hydrocarbon solvent solution of the rubber a combination of emulsifiers in which one or more quaternary ammonium emulsifiers (e. g. the quaternary ammonium compounds supplied under the Redicote trade mark), are combined with one or more fatty acid amine or diamine type emulsifiers in the ratio of quaternary ammonium to fatty acid amine in the range of from 1:5 to 5:1, notwithstanding that the quaternary ammonium emulsifiers alone, for the most part, will not form stable aqueous emulsions with the above types of hydrocarbon polymers.

For example a stable aqueous latex is obtained from hydrocarbon rubber e. g. butyl rubber or ethylenepropylene rubber, dissolved in an aliphatic or even an aromatic solvent, e.g. hexane, benzene, toluene and/or the zylenes, with the aid of a mixture of the emulsifiers selected from subgroups (a) and (b) in the ratio of 0.5:5 to 5:0.5 parts by weight, said mixture being employed in the amount of 2 to 10 parts by weight based on the polymer, and said sub-groups (a) and (b) being represented by formulae I and II respectively:

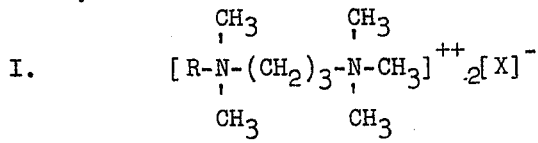

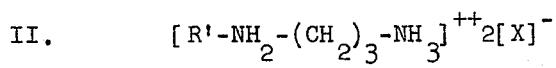

wherein R and R' are selected from the alkyl radicals having from 8 to 22 carbon atoms and X is an acid anion, preferably the alkyl radicals being those derived from cocoanut oil and/or tallow fatty acids.

The quantity of emulsifier employed in this invention is in the range of 2% to 20% by weight and preferrably 4% to 12% by weight based on the high polymer composition; and if desired, small additions of electrolyte may be made to the latex or in preparing the course or fine emulsion, as, for example, in accordance with the practices referred to in U.S. Pat Nos. 2,955,094 issued Oct. 4, 1960 and 3,222,311, issued Dec. 4, 1965, to Esso Research and Engineering Company, as assignee of R. S. Brodkey et al., and A. L. Miller et al. Alkali metal acid phosphate salts are suitable for this purpose, and are also useful in connection with the use of the addituent 24d (FIG. 1) as above described, for reducing the quantity of said addituent required.

e. Monomer Materials 24b, 1224b

The ethylenically unsaturated monomer material employable herein is selected from the class consisting of:
i. the mono-ethylenically unsaturated aromatic hydrocarbon monomers containing from 8 to 18 carbon atoms,
ii. the conjugated diene hydrocarbon monomers containing not more than 12 carbon atoms,
iii. the non-conjugated diene hydrocarbon monomers containing not more than 18 carbon atoms,
iv. the mono-ethylenically unsaturated monomers containing polar groups and having not more than 18 carbon atoms, and
v. the non-conjugated diene and triene monomers containing polar groups and having not more than 22 carbon atoms,
the polar groups of iv and v being selected from the class consisting of carboxyl, hydroxyl, carbonyl, ester, ether, nitrile, amine, quaternary ammonium, amide, triazine, halogen, and sulfur or phosphorous containing groups.

Examples of the respective groups of monomers comprised in the above class are set forth in my aforesaid applications, particularly application Ser. No. 784,596, filed Dec. 18, 1968, (now U.S. Pat. No. 3,644,263) and are herein incorporated by reference.

f. Free-Radical Generating Polymerization Catalysts 24a, 1224a

The free-radical generating catalysts and catalyst systems useful in the range of 0.8 to 20 parts per 100 parts of added monomer materials employed in certain embodiments of the present invention constitute a well-known class which includes: the inorganic peroxides such as hydrogen peroxide and the like; the various organic peroxy catalysts, such as the dialkyl peroxides, e. g. diethyl peroxide, diisopropyl peroxide, dilauryl peroxide, dioleyl peroxide, distearyl peroxide, di-(tertiary-butyl) peroxide; di-(tertiary amyl) peroxide, dicumyl peroxide and the like; the alkyl hydrogen peroxides such as tertiary butyl hydroperoxide, tertiary amyl hydroperoxide, cumene hydroperoxide, tetralin hydroperoxide, and diisopropyl benzene hydroperoxide and the like; the symmetrical diacyl peroxides, for instance acetyl peroxide, propionyl peroxide, lauroyl peroxide, stearoyl peroxide, malonyl peroxide, succinoyl peroxide, phthaloyl peroxide, benzoyl peroxide; ketone peroxide such as methylethyl ketone peroxide, cyclohexanone peroxide, and the like; the fatty oil acid peroxides, such as cocoanut oil acid peroxides and the like; the unsymmetrical or mixed diacyl peroxides, such as acetyl benzoyl peroxide, propionyl benzoyl peroxide and the like; the azo compounds such as 2-azobis(isobutyronitrile), 2-azobis (2-methylbutyronitrile), 1-azobis (1-cyclohexancarbonitrile) and the like, and other free radical generating catalysts employable in emulsion polymerization, such as peroxy-catalyst compounds in combination with a reducing compound such as an amine, e. g. triethylene tetramine or tetraethylene pentamine, with or without metallic ion combination, e. g., ferrous ions, which systems are referred to as "redox" free-radical generating catalyst systems, which latter are further exemplified in the treatise "Emulsion Polymerization" by F. A. Bovey, et al., 1955 Interscience Publishers, Inc., New York, N. Y. at pages 71–93, herein incorporated by reference.

g. Cross-linking Agents 24c, 1224c

The cross-linking agents useful, in the range of 0.1 to 20 parts per 100 parts of polymer content of the latex by weight, for effecting the cross-linking employed in particular embodiments of the present invention, also form a well-known class of materials which includes: elemental sulfur, selenium and tellurium, and compounds containing these elements, usually in their lower valence states or covalance states, and other polyfunctional free radical generating catalysts. Compounds which liberate sulfur, selenium or tellurium during irradiation or during heat aging (100° to 200° C.) are useful. Polymers containing sulfur, selenium or tellurium and/or monomers capable of forming such polymers are also useful. Conventional rubber vulcanizing agents and vulcanizing accelerators are particularly adapted to this application. Specific compounds of the class are: The mercapto thiazoles, such as 2-mercaptobenzothiozole and its salts, for example its zinc salt, thiuram sulfides, such as tetraethylthiuram monosulfide and tetrabutylthiuram monosulfide; guanidines, thiourea, substituted thioureas, thiocarbanilides, substituted thiocarbanilides such as o-dimethylthiocarbanilide and its isomers and alkyl homologs; zinc dialkyl dithiocarbamates such as zinc dimethyl dithiocarbamate, zinc diethyldithiocarbamate, zinc dibutyl dithiocarbamate, and zinc dibenzyl dithiocarbamate or accelerators containing these materials, thiurams such as tetramethylthiuram disulfide, tetraethylthiuram disulfide, and other tetra substituted thiuram disulfides; selenium dialkyl dithiocarbamates such as selenium diethyldithiocarbamate; 2-benzothiazyl-N,N-diethylthiocarbamyl sulfide; sodium or potassium dimethyldithiocarbamate; xanthates such as dibutyl zanthogen disulfide and Naugatuck Chemical's CPB and ZBX; alkyl phenol sulfides; bis(dimethylthiocarbamyl) disulfide, dipentamethylene tetrasulfide; and sulfur containing polymers such as Thiokol VA-3, 4,4-dithiomorpholine and disulfides such as benzothiazyl disulfide. In fact, any compound in which sulfur, selenium or tellurium is attached only to an atom of carbon, hydrogen, nitrogen or to another sulfur, selenium or tellurium atom, as the case may be, may be suitable.

Also included in the class are the sulfonyl hydrazides and disulfonyl hydrazides. The latter are particularly useful since they contain two widely separated sulfur-bearing moieties capable of forming sulfur cross-links or free radical derived cross-linkages (as a result of thermal loss of nitrogen). Blowing agents such as p,p'-oxybis (benzene sulfonyl hydride), p,p'-diphenyl bis(-sulfonyl hydrazide) and m-benzene-bis(sulfonyl hydrazide) are examples of additives which can also be employed as cross-linking agents.

Included in the class are the cross-linking azo compounds, e.g. di-cyano-azo-butane; and the like.

Included in the class are also the peroxy compounds such as bis($\alpha$-, $\alpha$-dimethyl-dicumy.) peroxide (dicumyl peroxide), 1,3-bis($\alpha$-, t.butylperoxypropyl) benzene, 2,5-bis(t.butylperoxy)-2,5-dimethylhexane, 2,5-dimethyl-2,5-di(t.-butylperoxy)hexyne-3, di($\alpha$-, $\alpha$-dimethyl-p-chlorobenzyl)peroxide, di($\alpha$-, $\alpha$-dimethyl-2,4-dichlorobenzyl) peroxide, di($\alpha$-, $\alpha$-dimethylnaphthyl)peroxide and the like.

Further included in the class are combinations of the above said peroxy compounds and the above said sulfur, selenium and tellurium compounds.

h. Ionizing Radiation

The ionizing radiation employed in certain embodiments of the present invention is of a type known to those skilled in the art, viz: it is radiation with sufficient energy to remove an electron from an atom, forming an ion pair; this requires an energy of about 32 electron volts (ev.) for each ion pair formed. This radiation has sufficient energy to non-selectively break chemical bonds; thus, in round numbers radiation with energy of 50 electron volts (ev.) and above may be used in lieu of polymerization catalyst. Such ionizing radiation is generally classed in two types: high energy particle radiation, and ionizing electromagnetic radiation. The effect produced by these two types of radiation is similar, the essential requisite being that the incident photons have sufficient energy to break chemical bonds and generate free radicals.

The preferred radiation for the practice of the said embodiments of this invention is high energy ionizing radiation, and has an energy equivalent to at least 0.1 million electron volt (mev.). Higher energies are even more effective; there is no known upper limit, except that imposed by available equipment and the product stability.

When irradiation is employed in the present invention, it is preferably effected at about atmospheric pressure and at temperatures between about 5° and 95° C., a temperature of about 25°–65° C. being preferred.

As is well known in the irradiation grafting of solid substrates, the optimum dose of irradiation varies with the particular materials concerned, a dose of about 5,000 rads (0.005 mrad) being required for significant grafting. Dosages and dosage rates may be selected between the limits which with given latices and under the conditions concerned are sufficient to not require excessive time of treatment and those not so high as to cause excessive rise of temperature, e.g. above 95° C., or excessive decomposition of materials concerned. Such limits are well understood by those skilled in the irradiation art, and are readily determined for particular materials by simple tests as above indicated.

i. Equipment

Homogenizers

While the invention in its broader aspect is not limited to any particular homogenizer, the applicant has disclosed that certain types of homogenizer described in Mould, Jr. U.S. Pat. No. 3,195,867* and Hager U.S. Pat. No. 3,194,540* as suitable for low viscosity materials such as milk, oil, fruit slurries, etc., can be employed effectively as an ultradisperser of aqueous emulsions of higher viscous solutions of polymer compositions, especially when connected in tandem, and/or for recycle, and in particular that a combination of such "Mould" type homogenizers followed by a resiliently restricted orifice type high pressure homogenizer (1,000 to 10,000 p.s.i.) e.g. of the "Gaulin" type (see Gaulin U.S. Pat. Nos. 753,792* and 756,953* as available from Manton-Gaulin Mfg. Co., Inc., as model K24-3BS but provided with a 75 horsepower motor, provides an aqueous emulsion of solvent/polymer cement yielding a latex having latex particles of an average diameter near the upper end of the colloidal size range suitable for high solids polymer latices, and of relatively narrow particle size distribution, when processed according to the invention.

\* Herein incorporated by reference.

In FIG. 2 there is shown an arrangement of such Mould type and Gaulin type homogenizers to constitute a preferred cement emulsifying equipment. This arrangement is provided with optional facilities selectively employable by means of valves for continuous or batch operation, for single unit or tandem unit operation, and for selective complete or partial recycle in each mode of operation, and it will of course be understood that where certain of these optional facilities are not desired they may be omitted without departing from the invention.

In this FIG. 2 arrangement the solvent and polymer dispersion 107 and the water and emulsifier solution 108' are adjusted in temperature by heat exchangers 110A and passed to the course emulsion mixer equipment. For batch operation, as shown, this equipment may be in the form of a hold tank 110 provided with an agitator. For continuous operation, as shown, it may be in the form of in-line mixing equipment 110B. The in-line mixer equipment 110B may also be employed to premix the materials being delivered to tank 110 for batch operation. The coarse emulsion in batch operation is passed from tank 110 under gravity head and/or pressure head contributed by pump 110C to the ultradispersing equipment 112 and/or 112A and/or 112B, or for continuous operation may be passed to the latter directly from the in-line mixer equipment 110B, and under the head developed thereby augmented, if desired, by the heat developed by pump 110C. The coarse emulsion under pressure as aforesaid may be passed through any one of more of the ultradispersing equipments 112–113B and may be recycled therethrough either directly, or by way of the coarse emulsion tank 110. When the preparation of the emulsion of precursor latex sized particles has been completed this intermediate product may be delivered to storage 113j, preferably being cooled by means of a cooler 113F to assure maintenance of the emulsion even with minimum quantities of emulsifying agent present. As is indicated in FIG. 2, effective results have been attained by repeatedly passing the coarse emulsion through an equipment 112 of the perforated stator type shown in Mould, Jr. U.S. Pat. No. 3,195,867, and then through one or more equipments 112A and/or 112B in tandem with, and similar to, equipment 112 but provided with a slotted stator of the type illustrated in FIGS. 5 and 7 of Hager U.S. Pat. No. 3,194,540, with recycling from equipment 112A to the tank 110 and then by gravity head through equipments 112 and 112A, about a half dozen to a dozen times before delivery of the resulting product to the storage tank 113. During recycling, especially with sensitive emulsion prepared with a minimum of emulsifying agent, it is desirable to cool the emulsion which has been heated by working in the ultradispersing apparatus, by means of a heat exchanger in the recycle line, as at 112C.

After the emulsion has been reduced to unstable emulsion of precursor latex particle size, when this feature of the process is employed, a further amount of emulsifier may be combined therewith as shown at 113g in FIG. 2 by simple mixing as in mixer M in the lines leading to 113F, without further homogenizing action that would further reduce the particle size of the dispersed phase. The emulsion of at least temporarily precursor latex particle size in the desired range may be fed, when stable or stabilized, to storage 113 or 113j, or, when only temporarily stable may be fed directly to the mixer or aerosol generator of FIG. 3 via valved line 113h or valved line 113i.

As is further shown in FIG. 2, various types of homogenizer can be employed for forming the fine emulsion of cement at least temporarily of precursor latex particle size, e.g. a homogenizer of the colloid mill type 213, a homogenizer 313 of the vibrating blade type such as the liquid whistle or "Rapisonic" (trademark) types (presently preferred when used as in FIG. 7), or an emulsifier of the high pressure resiliently restricted orifice type 113D, 113E to which the emulsion effluent from the ultradispersers 112–112B is fed after heating, e.g. to temperatures of 140°–160° F by the heat of 113A. The Gaulin type homogenizer comprises the pump 113D which is a plunger pump that develops from 1,000 to 10,000 p.s.i. depending on the resilient load applied to the valve head means resiliently restricting the emulsifying orifice or valve-opening means of the device. This load can be adjusted in the commercial devices by means of a hand wheel, shown at the entrance end of the homogenizer 113E. The output from the unit 113E may be delivered to cooler 113F and thence to storage 113j, or via 113h, or may be stored in tank 113 when recycling through the homogenizer circuit 113D–113F is desired.

Stripping Mixer

The stripping mixer 14 (FIG. 1) which disperses the aqueous emulsion of precursor latex sized solvent/polymer droplets into the gaseous stream of steam is preferably of the type illustrated in FIG. 4, consisting of a conduit section 114, which may be transparent, which has supported centrally thereof a torpedo shaped or fid-shaped member 114A for producing a restricted or venturi-effect passage 114B thereabout. The initial continuous phase of steam is admitted as at 114C to flow through the passage 114B and produce an area of high velocity and low static head thereat. The aqueous emulsion of solvent-polymer solution is introduced into the central body 114A as by way of the tube 114D upon which it is supported, and issues into the gas stream via a narrow slot 114E extending peripherally of the body 114A at the region of greatest pressure reduced in the space 114B. Auxiliary steam and/or emulsifier may be introduced at 114F and 114G. When a downstream inlet, as 114G, is employed for admission of the auxiliary steam for practicing step (7) of the first embodiment of the invention summarized above, it is desirable to have the quantity of steam admitted upstream thereof, as at 114C, or at 114C and 114F, sufficient in heat content to vaporize substantially all the solvent from the precursor latex sized particles of the aerosol produced in the space 114B. When this condition is attained, as observed through the transparent conduit section 114 the surfaces bounding the annular and cylindrical passage through the conduit 114 remain free of liquid or solid materials and no foaming can be seen. The fact that the solvent-stripped particles of the aerosol and steam condensate remain in contact with the solvent-vapor phase of course establishes a vapor pressure equilibrium therebetween and the colloidal sized particles of the dispersed phase of the aerosol thus contains residual traces of solvent, e.g. of the order of 1% or less while the particles of the aerosol of greater than colloidal size may contain even greater amounts of residual solvent. The outlet of the aerosol generating section 114 connects to the vacuum equipment by way of the segregator and collector devices, as exemplified in FIGS. 3 and 5, and the vacuum in the chamber 114 is such that the temperatures attained do not exceed those at which the emulsion and latex are stable. As above noted, the heat for vaporization of the solvent from the solvent/polymer solution is for the most part derived from the condensation of the steam, and the flowing stream of steam and organic vapor carrying the resulting suspended latex droplets is in the nature of an aerosol, exhibits no foaming in the tube 114, and does not coat or foul the tube 114. As is illustrated in FIG. 3, the aqueous emulsion of solvent/polymer solution is usually supplied to the mixer 114 under pressure, as by a pump 114H.

Coalescing and Separating Means

Separating the latex from the aerosol is effected herein by a combination of coalescing means for coalescing the dispersed latex droplet phase of the aerosol into larger droplets or bodies of latex in the presence of the solvent-vapor gaseous phase, and means for then separating such larger bodies of latex from the solvent-vapor gaseous phase. In the present application and the aforesaid copending applications various forms of coalescing and separating means are disclosed, exemplified herein, e.g., by the delivery of the aerosol from the aerosol generator and stripper 114 (FIG. 3) through coalescing means 115, 215, or 315 to the hereinafter more fully described evacuated cyclone separator means 216, which is preferably internally coated by a sheet of recirculated liquid latex supplied via conduit 216F or conduit 216G and liquid distributor 216H. The coalescing means 215 is a plate type tortuous path segregator which keeps coalescing the liquid phase by impingement, and breaking any bubbles formed therein by impact, as the latex and gas progress down the tortuous path along the pressure gradient to that of the separator 216, and delivers the coalesced bodies of latex and gas to the separator 216. The coalescing means 115 is shown as a centrifugal segregator in which the coalescence is effected by centrifugal force, e.g. a centrifugal pump operating with cavitation and fed with the aerosol, and is representative of similar centrifugal coalescers illustrated in the second and third of my aforesaid copending applications. And the coalescing means 315 is typical of means wherein the aerosol is projected against an impact surface 315A to effect coalescence of the liquid phase impinging thereon when the gaseous phase is deflected thereby, and when the impact surface 315A is arranged coaxially of the aerosol inlet and rotated by a suitable motor 315B, as shown, the coalesced liquid may be centrifugally discharged against the annular surrounding wall 315C and may be withdrawn separately from the gas phase via separate conduits 315D and 315E, respectively, the discharge to the latter being from behind the surface 315A in the form shown. In this latter case, as in the case of FIG. 4 of copending application Ser. No. 691,823, the conduits 315D and 315E may both discharge into the separator 216 either directly or with the liquid delivered by way of the recirculating circuit as shown, or as illustrated in FIG. 16 herein, the separator 216 may even be omitted in some instances, where sufficiently low carryover of latex in the gas via 315E (1115G) enables that conduit to be connected directly to the condenser vacuum system thus converting the unit 315 (1115) into a combined coalescer and separator as shown in FIG. 16.

Separating, Condensing, and Evacuating Apparatus

As will be apparent to those skilled in the art the invention in its broader aspects is not dependent on the use of any particular type of separating, condensing and evacuating apparatus. Conveniently, when stripping azeotroping solvent, in the arrangement of FIGS. 1 and 3 as a separator or collector 16 (216) may be used a vertical cylindrical receiver, with a downwardly tapering bottom leading to a discharge opening connected to a positive displacement pump for removal of separated latex therefrom without breaking the vacuum, with a tangential side opening for passage of the two flows thereinto, and with a top opening for the discharge of the continuous phase to the condensing equipment. The latter conveniently may comprise two condensers, one for non-azeotroped water, and the other operating at a lower temperature for azeotrope of water and solvent. The evacuating apparatus conveniently may comprise a steam jet evacuation equipment connected to draw non-condensed material from the condenser equipment, or a vacuum pump.

In the form shown in FIGS. 3, 5 and 6, the collector 216 generally resembles a cyclone collector into which the gaseous flow and any latex droplets carried thereby are discharged tangentially from the inlet 215H, and guided along the walls by appropriate internal baffling, e.g. the spiralling skirt 216D, so that the liquid collects on the walls and flows to the bottom outlet 216C, while the gas passes to the top outlet by the way of the passage afforded by the central drop tube, or equivalent baffling means 216D to the condensor/vacuum system. Pump means 216E delivers the latex from the outlet 216C through the outlet valve 216B and, depending on pump and valve setting, wholly or partly via the recycle lines 216G, 216L. Valve 216M can be a pressure opened relief valve for maintaining a delivery pressure at the output of pump 216E while recycling all the latex not delivered by pump 324 or otherwise removed. As before mentioned, the walls of the collector 216 are preferably covered by a flow of latex from a distributor (616A of FIG. 6), which provision facilitates the collection of the latex droplets delivered by the gas stream while minimizing foaming, and simultaneously cooperates in the practice of the present improvements as hereinafter described in connection with FIGS. 1A and 3A.

As is also shown in FIG. 3, the freshly stripped latex, preferably after being freed of greater than latex sized particles in accordance with the present invention, and without removal of its residual solvent, may be delivered by pump 324*a* via heat exchangers 325 and/or 325*a* and/or storage hold tank 324*b* to means for modifying the latex which may be used separately or in combination in the arrangement shown. The concentrating circuit 1216–1220 corresponds with the concentrating circuit 31–32 of FIG. 1; and the modifying equipment 1224–1233 provides for delivering the latex from 324a or 324b to a polymerization reactor 1227 (either directly or after concentration in the concentration equipment sections 1216–1220), where it may be combined with polymerization catalyst, monomer, cross-linking agent, compounding ingredients and/or emulsifier, from selected ones of sources 1224a to 1224e for modifying the size and nature of the latex polymer as described more particularly in my aforesaid copending applications.

The modified latex from the reactor 1227 may be mixed with further emulsifier in mixer 1224f and may be passed to storage 1233, with or without first recycling it through the concentration equipment section and/or the polymerization reactor. Where further stabilization is desired emulsifier may be added from 324C or 324D.

Referring again to FIG. 16, the aerosol generating equipment 114H, 1114, 1115B (which is broken away to indicate provision for insertion of a homogenizer, e.g. in accordance with FIG. 7, between pump 1114H and generator 1114, and to indicate provision for insertion of steam and/or emulsifier injectors as 114F and 114G of FIGS. 3 and 4 at the discharge end of aerosol generator 1114) discharges into the bowl 1115A of centrifugal bowl type coalescer-separator 1115 from which the gaseous phase (consisting principally of solvent-vapor) is withdrawn at 1115G to the condenser/vacuum system. The liquid phase separated in the device 1115 is delivered to a standpipe 1115L communicating with the vapor space in 1115, for the most part by way of the scoop off-take 2115E. A pump 1115M controlled by the latex level in standpipe 1115L delivers the latex to outlet 1115N for recycle in part if desired to the input to pump 1114H and/or to the bowl 1115A by way of nozzle 1115K through a squeeze valve 1115P set to maintain a back pressure at 1115N when connected thereto. The latex coalesced and separated in 1115 is in contact with the solvent-vapor phase of the aerosol and therefor contains a trace of solvent due to the vapor pressure equilibrium. Latex of such solvent content is withdrawn through 1115Q and heated below its de-stabilization temperature, in heat exchanger 2115H (preferably a plate package type heat exchanger wherein the latex and steam evolved therefrom pass between paired plates heated by hot water circulated between the pairs). The heated latex and vapor (essentially steam with but the trace of solvent) are then delivered to another evacuated centrifugal separator 2115 similar to 1115, and the latex delivered to its standpipe 2115L is similarly delivered to outlet 2115N for recycle via squeeze valve 2115P for further concentration in 2115H and 2115, and for delivery to product removal 2115Q as by pump 2115R. The latex so delivered is generally essentially free of solvent because of the very low solvent vapor pressure 2115; however 2115Q may deliver to a further concentrator 2115-2115Q if desired.

FIG. 7 at 1313 illustrates the direct connection of the solvent polymer emulsion homogenizer 113, 213, or 313 of FIG. 2 (preferably the vibrating blade type emulsifier 313, FIG. 2) to the aerosol generator 1314 as is particularly desirable when operating with an unstable emulsion in which the solvent-polymer droplets are only temporarily of precursor latex particle size. As is well known to those skilled in the art the vibrating blade homogenizer or Rapisonic receives emulsion at medium pressure from a pump 1314H and forms it into a jet which impinges on the edge of a resonantly vibrating blade 1313A and the homogenized emulsion is delivered at a low gauge pressure through a choke valve 1313B. The generator 1314 with streamlined nozzle 1314A is as described in connection with FIG. 4, but may be replaced by other suitable devices, depending on the conditions to be met, particularly forms of which are illustrated in FIGS. 12 to 15. In the form of FIG. 12 the conduit 514 is shaped to provide a venturi-like section, and the discontinuous phase is dispersed into the continuous phase (supplied through 514D) by a slotted nozzle 514A located axially of the venturi-like portion of the conduit. In FIG. 13 a similar arrangement 614, 614A, 614D is provided, the nozzle having an axial non-annular discharge at the venturi-area; and the mixer 714 of FIG. 14 is similar but with the supply connections reversed. Finally, the mixer or aerosol generator of FIG. 15 is similar, the latex inlet 814A being air-insulated at 814E from any extended contact with the steam introduced through 814D. While fluid inlets directed tangentially may be employed, substantially linear flow at considerable velocity is preferred at the venturi or mixing areas, especially when the mixers of FIGS. 4, 7, and 12–15 are employed as aerosol generators.

Modifications

In the form of FIG. 3 the gaseous phase and more or less coalesced liquid phase of the aerosol are delivered into the separator 216 constituting the zone of minimum pressure in the system, and are there preferably impinged upon liquid latex recirculated through 216.

In modifications of the invention illustrated in FIGS. 8 through 11, an additional step is employed in that coalescence and separation of the aerosol are aided by combining the stream of aerosol and the stream of concentrated latex and water vapor evolved therefrom in a mixer and intimately commingling the same before introducing them into the separator (zone of minimum pressure).

Referring to FIGS. 8 to 11, in these embodiments as in those above described, there is provided a moving flow 814a of gas essentially comprising steam as an initial continuous phase, and a flow 813a of aqueous emulsion of solvent polymer cement. The cement preferably consists essentially of a dispersion of not more than 40 parts of the polymer composition 4 (FIG. 1) in essentially not less than 60 parts of water immiscible volatile organic solvent which itself, or as an azeotrope with water, has a boiling point lower than that of water. In determining these ratio limits other materials present, e.g. emulsifier, are not included in the calculation. An aerosol generator 814 is provided in which the flow of emulsion 813a is dispersed, as a discontinuous phase, in the flow 814a, in such proportions that sufficient heat is supplied by the steam flow 814a to vaporize substantially all the solvent from the liquid phase into the gaseous phase of the flow in 814, to form an aerosol therein while adding the condensate formed therein to the discontinuous phase of the aerosol. The flow of aerosol is withdrawn from the generator 814, and in accordance with these modifications, is subjected, in the combination hereinafter described, to a separation of its liquid discontinuous phase from its continuous gaseous phase to form a latex by passing it into a suitable separator 816. A flow of the latex is withdrawn from the separator 816 and this flow is mixed with the flow of aerosol withdrawn from the generator 814 in a mixer 821 of any suitable construction (e.g. the form of any of FIGS. 12 to 15 may be employed) to produce the combination in which the aerosol is subjected to separation in the separator 816, so that the admixture of the flow withdrawn from 816 with the flow of aerosol before its introduction into the separator 816 may assist in the coalescence and separation of the liquid and gaseous phases. A part of the latex separated in the separator 816 is withdrawn as output, as by pump means 822.

In practicing these modifications, further improvements may be obtained by converting to a flow of water vapor mixed with bodies of more concentrated latex the withdrawn stream of latex passing from the separator 816 to the mixer 821, as by passing it through a water vaporizer 820 which may be of the plate type described above (see 220 and 1220 FIG. 3). In this modification the bodies of more concentrated latex mixed with the aerosol in mixer 821 aid in coalescing the discontinuous phase thereof in said mixer, and the water vapor from 820 dilutes the solvent-vapor content of the aerosol and alters the partial pressures to the advantage of the latex.

As shown in FIGS. 8, 9 and 10, the aerosol from generator 814 may be subjected to coalescing stresses as by passing it through a coalescing means 815, similar to those above described, prior to its introduction to the mixer 821; or the mixed flow of latex and vapor produced by the mixer 821 may be subjected to coalescing stresses as by passing it through a coalescing means 815A, similar to those above described; or both of these provisions may be included. For simplicity, the use of coalescers 815 and 815A of the plate type tortuous path segregator form above described (215, FIG. 3) is preferred.

Especially when these modifications are carried out using an aqueous emulsion of solvent-polymer cement 813*a* which is unstable and has its dispersed phase only temporarily of precursor latex particle size, it is advantageous to add further emulsifier 823 to the fluids being mixed in 821. Such addition may be effected by adding the emulsifier at the mixer or to at least one of the flows of fluid passing thereto, as shown.

Present Improvements FIGS. 1*a* and 3*a*

As before mentioned, despite all the provisions made in the arrangements of FIGS. 1–16, just described, for facilitating production of a stable latex, it sometimes occurs that because of need to cut short a homogenizing step, or to expedite production, or for some other reason, it may be necessary to take special precautions to insure against the delivery of a latex product containing a proportion of particles of greater than colloidal size which can deleteriously effect the mechanical stability of the latex.

Also at times, due to insufficient emulsification, or aging of emulsions before processing, or other circumstances, a quantity of latex may be produced which fails to meet the test for mechanical stability set forth at the outset herein.

Furthermore, since the high polymer materials from which the solvent cements are formed are valuable and unnecessary processing is expensive, it is desirable to reduce to an absolute minimum losses of such material in the processing.

By the present improvements special provisions are made to these ends, as will now be described with reference first to FIG. 1A.

FIG. 1A illustrates modifications adapted to be substituted for elements 13 through 24 in FIG. 1. In this arrangement, the fine cement emulsion from 13F, FIG. 1, as shown at 13', FIG. 1A, is an emulsion of principally precursor latex particle size but may contain some particles of greater than precursor latex particle size. I have found that when such a solvent containing emulsion is first passed through the steam mixer 14' adjusted to a temperature at reduced pressure which is within the upper limit for stability of the emulsion, and then segregated separated and recirculated through heater 21, to separator 16 or mixer 14 as shown in FIG. 1, if the tortuous path or other heater 21 is heated to temperatures in the range of above 212° to 260° F. (preferably from 225° to 245° F.) for a limited time a selective coalescence can be effected of the larger than latex sized particles without causing coalescence of the colloidal latex sized particles, and that the selectively coalesced particles can be removed thus yielding a mechanically stable latex, such limited time being in the range of a few microseconds to about a minute or so.

I have further found that if a latex has been prepared which will not meet the mechanical stability test aforesaid, by the return of such a latex to the circuit 16–21 (FIG. 1), with the tortuous plate heater 21 so adjusted, substantial removal of the larger sized particles; may in certain instances be facilitated when solvent is imbibed into the latex to the extent of about 10% or more of the dry solids content thereof, and the latex is then passed through the steamer mixer 14 and segregator into the separator and thence through the tortuous path heater 21 as aforesaid. It is therefor evident that the passage of a solvent cement aqueous emulsion or a solvent swollen latex, through the steam mixer, in some way differentiates the susceptibility of the larger sized particles from that of the colloidal sized particles with respect to coalescence by heat and mechanical working, so that the passage thereof through a tortuous path heater 21 at a sufficiently high temperature on a recycle through the separator 16 produces selective coagulation of the larger sized particles, and that on separation of such coagulum the remainder of the latex is found under microscopic examination to be essentially free of larger than colloidal sized particles, and to meet the mechanical stability test aforesaid.

To obtain this improvement and further cooperating advantages, in FIG. 1A the emulsion (or solvent swollen latex) 13' is passed through the mixer 14' with steam from 14*a'* substantially equivalent in heat content to that of the solvent therein. The aerosol thus formed is coalesced by passing it through a segregator 15A' or 15B' (one of which is used while the other is being cleaned with a quantity of the same solvent which is present in the material 13') and thence to the separator 16' where the coalesced latex is at a temperature of 102° F. (the temperature corresponding to that of saturated steam at the 27 inches of vacuum maintained in the separator 16'. The so conditioned latex is then passed through a filter A or filter B (one being used while the other is being cleaned with solvent) and pumped at about 50 p.s.i.g. into the tortuous path heater 21A' or 21B' (one being used while the other is being solvent cleaned) through which its pressure drops as it is heated, the heaters 21A' or 21B' being maintained at from 212° to 260° F., preferably 225 to 245°F. during this latex heating, and the outlet pressure from 21A' (or 21B') being substantially about 27 inches of vacuum maintained in the separator. It has been found that by this treatment a small proportion of coagulum is caused to collect in the heaters 21A' or 21B' and in the filters A and B, and that the latex thus produced, both before and after concentration, is essentially free of non-colloidal sized particles and meets the mechanical stability test, usually yielding essentially no coagulum under that test.

While applicant does not fully understand why this result is obtained, and is not to be found by any hypothesis or theory in this regard, applicant believes that during the formation of the aerosol in the mixer 14', the solvent vaporizes almost instantaneously from the precursor latex sized particles, reducing any residual solvent therein to that corresponding to equilibrium with the gas phase at about 102°F and a vacuum of 27 inches of mercury, but that the volatilization of solvent from the particles of greater than precursor latex size cannot take place so rapidly and that such particules therefore contain more solvent when the latex is collected in the separator than do the colloidal sized particles thereof. Applicant further believes that when latex containing these two classes of particles is passed in contact with surfaces heated to temperatures in the range of above 212° to 260°F., so little volatilization of solvent occurs from the latex sized particles that the ability of the emulsifier thereon to prevent agglomeration thereof is not affected, but that so much volatilization of solvent may occur in the greater than colloidal sized particles that the particles are swollen and enlarged thereby causing rupture of the emulsifier thereon and allowing such larger particles to coalesce and agglomerate with each other under the impact working in the tortuous path, that some of this agglomerate adheres to the plates of the heaters 21A′ or 21B′ and that some of it is carried along with the latex, and finally removed therefrom by the filters A or B.

Further exemplification of the process improvement just described, and of preferred arrangements of apparatus for facilitating the practice thereof, are set forth in FIG. 3A. In this arrangement to facilitate continuous operation and minimize shut-down time, two alternatively usable aerosol generators and segregators 2114A and B and 2215A and B are each provided with isolating values V and with valve controlled flushing and solvent cleaning circuits 2405, so that one may be operatively connected to the separator 2216 while the other is isolated and serviced. To maintain the flow of liquid in the separator 2216 upon which the segregated aerosol is impringed, the sêparator is provided with a level controlled pump 2216E which delivers to the product outlet pump 2324 a part of the circulating liquid under a fixed head maintained by squeeze valve 2324*a*, the remainder of the circulating liquid being delivered through the squeeze valve to a constant level tank 2324M which may be maintained under reduced pressure as by a valve controlled connection 2324L to the evacuated separator 2216.

The constant level in the hold tank 2324M is maintained by pumps controlled by the level therein which deliver to or from a storage tank (not shown) via connection 2324K.

A pump 2324N delivers liquid from the hold tank 2324M under a suitable pressure, in the range of 10 to 100 p.s.i.g. (preferably about 50 p.s.i.g.) through one of two alternatively usable filters 2324P (A) and (B) which are each provided with isolating valves V and the usual drain cocks and, if desired, with valve controlled solvent cleaning circuits 2402.

The liquid (i.e. latex except at start-up) is delivered under pressure from the operating filter 2324P (A) or (B) through line 2216B provided with a pressure guage 2325 to one of two alternatively usable tortuous path plate type heat exchanges 2220 (A) and (B) as previously described, which are each provided with isolating valves V and with valve controlled flushing and solvent cleaning circuits 2403, and with valve controlled sources 2236 of heating fluid at less than 212°F. (e.g. 180°F.) for use, if desired, when solvent cleaning; at greater than 212°F. but not more than 260°F. (e.g. 235° to 245°F.) for use when practicing the process improvements of the present invention; which may also have "off" and cold water positions as shown for use during shut-down of operations and preparation therefor.

The liquid entering the tortuous path heater 2220 (A) or (B) is heated therein as its pressure drops from about 50 p.s.i.g. to about 27 inches of vacuum at the connection thereof to the separator 2216 for spreading the sheet of liquid (latex or water during start-up) to separate from the solvent vapor stream the latex delivered to the separator 2216 therewith by the segregator 2215 (A) or (B). A source of flushing water 2237 is also provided for flushing out the entire circuit 2216–2220 (A) or (B) on shut-down.

The invention will be most readily understood, and the basis for the aforesaid theory will be best appreciated, by reference to the following examples illustrating preferred embodiments of the invention and contrasting the same with other practices, but it will be understood that these examples are illustrative and not restrictive of the invention.

EXAMPLES

Example 1 (informative)

A butyl rubber latex which contained 64% solids was found to yield 35% coagulum (by weight based on the dry solids content of the latex) when a sample thereof was subjected to the mechanical stability test aforesaid. Microscopic examination shows this latex to contain a substantial number of particles of greater than colloidal size. To 250 lbs. of this latex is added 150lbs. of water to dilute the latex to 40% solids content, and this diluted latex is fed into the hold tank 2324M (FIG. 3A) via the line 2324K and circulated repeatedly through the circuit comprising the pump 2324N, filter 2324P (A), line 2216, heater 2220 (A), separator 2216, level controlled pump 2216E and squeeze valve 2216M at a rate initially measured at 30 gallons per minute until a concentration of 62% solids is attained. The pressure of the latex being pumped into the tortuous path heater 2220 (A) is measured by gauge 2325 at an initial 50 p.s.i.g. The separator 2216 is maintained at a vacuum of 27 inches mercury. The heater 2220 (A) is a Rosenblad plate heat exchanger using size No. 22 herringbone configuration corrugated plates measuring 8½ by 26¼ inches inside the gaskets, arranged to provide latex flow in series through four sets of plates each having six pairs of plates therein and then through a set of plates having four pairs of plates therein, hot water at 240°F being circulated between the pairs of plates at 500 gallons per minute for the package to keep the entire plate surface area of substantially 240°F, the machine being started with water in the aforesaid latex circuit until the heating temperatures are established, before the introduction of latex is commenced. The 62% solids content latex thus produced is again subjected to the mechanical stability test and shows substantially no change from the 35% coagulum measure, and on examination under the microscope shows the presence of about the same proportion of non-colloidal particles as before.

Example 2 (Improving mechanical stability of latex)

Example 1 is repeated with another portion of 250 lbs. of the same 64% solids latex diluted with 150 lbs. of water the conditions being the same except that 16 lbs of toluene is stirred into the latex, and except that the so prepared latex, after standing for 2 to 3 hours, is fed at a rate of 4 gallons per minute with a quantity of steam sufficient to substantially vaporizes the toluene, through the mixer 2114A (FIG. 3A) and the unheated segregator 2215 (A) to the separator 2216 and thence through the heating and concentrating circuit, which as before, has been started with water before the latex is introduced. The pressure and temperature in the mixer 2114(A) read by guages located as shown in FIG. 3A, are measured at a partial vacuum of 20 inches of mercury and 165°F. The unheated segregator 2215(A) is a plate package having 40 Rosenblad No. 31 herringbone configuration corrugated plates measuring 14 by 42¼ inches inside the gaskets, and arranged so that the aerosol makes a single pass lengthwise between all 40 of the plates in parallel, while its pressure is dropping from 20 inches to 27 inches of mercury. The circulation through the corrugated surface heater 2220(A) is continued as in Example 1 until a latex concentration of 63% solids is attained, and during this period a small amount of coagulum accumulates on the plates of the heater 2220(A) and in the filter 2324P(A). The 63% latex thus prepared under the mechanical stability test yields no coagulum, and on microsocopic inspection shows no particles of larger than colloidal size.

Thus Example 2 illustrates the application of the present invention to the conversion of latex of poor mechanical stability to latex of high mechanical stability.

Example 3.

A rubber cement is prepared from 800 lbs. of butyl rubber (Enjay Butyl Rubber No. 268, a trademarked product), and 3200 lbs. of toluene and mixed with emulsifier solution to form a crude emulsion. The emulsifier solution comprises 142 lbs. of Alipal CO-433, 28% active (a trademarked product), 8 lbs. of monosodium phosphate ($NaH_2PO_4$) and 2000 lbs. of water. The crude emulsion at 160°F. is converted to a fine emulsion by recycling for 2 hours through a homogenizer of the type described in U.S. Pat. No. 3,195,867 to Mould operated at 5200 RPM with the aid of a 15 H. P. motor (see FIG. 2) and then passing 6 times through a Rapasonic homogenizer, at about 200 p.s.i. inlet pressure and 30 p.s.i. outlet pressure. The so homogenized fine cement-in-water emulsion is immediately fed to the aerosol generator and concentrator system as set forth in Example 2 except that the greater solvent content and consequent greater steam supply results in a pressure in the aerosol generator measured as a vacuum of 10 inches of mercury. Concurrently with the steam stripping of the emulsion in the aerosol generator the resulting latex is partially concentrated to 30% solids employing concentrating circuit 216–220, FIG. 3 (or 2216–2220(A), FIG. 3A) with element 220 or 2220(A) heated with water at 200° F, and the latex product of 30% solids content is then fed to the concentrator equipment of FIG. 3 and concentrated to 60% solids, the resulting latex being a stable butyl rubber latex.

As an alternative to the use of the separate concentration equipment section of FIG. 3, the latex can be carried to its full concentration of over 60% in the circuit 2216–2220(A) and (B) by increasing the flow rate and/or temperature therein and/or reducing the rate of feeding of emulsion to the aerosol generators 2114(A) or (B).

Example 4

Example 3 is repeated all conditions being the same except that the homogenized fine cement in water emulsion before being injected into the aerosol generator, is stored (i.e. aged) for a week after its preparation. At the end of this period, under microscopic examination a sample of the stored fine cement-in-water emulsion shows the presence of a small proportion of particles of greater than precursor colloidal size. The 60% solids latex resulting from the aerosol stripping and concentrating of this aged emulsion under the mechanical stability test aforesaid, shows over 20% coagulum, and under microscopic examination shows the presence of a considerable number of greater than colloidal sized particles.

Example 5

Example 4 employing the aged latex is repeated with but a single change, namely, the operation of the surface heater 220 (2220(A)) at temperatures greater than 212° F. and less than 260° F., in this instance at 240° F. The resulting latex of 60% solids content under the mechanical stability test shows no coagulum, and under the microscope shows no non-colloidal particles; and there is a small accumulation of coagulum in the heater 220 (2220(A)) and the filter 2324P(A).

Thus Example 5 illustrates the advantage of the present invention in the production of latex of high mechanical stability from solvent-polymer aqueous emulsions containing a proportion of the dispersed phase in particles of greater than precursor latex particle size.

Example 6

Example 5 is repeated continuously with sequential chargings of emulsion prepared as therein described. After each 3 hours of operation with one of the filters 2324P(A) or (B) of FIG. 3A in circuit, the valves associated with the filters are manipulated to isolate that filter from the circuit and connect the other filter in the circuit. The so isolated filter is then drained of latex and either washed in place with solvent (toluene in this instance), or has its filter element removed for such washing and replacement by a clean filter element. After each 8 hours of operation with one of the plate heaters 2220(A) or (B) in circuit, the valves associated with those heaters are manipulated to isolate that heater from the circuit and connect the other heater in the circuit. The heat supplied to the so isolated plate heater is reduced or cut off and its latex passages are flushed with water through the solvent lines to remove the latex therefrom, and then washed in situ by circulating hot solvent (toluene) therethrough for a period sufficient to dissolve the polymer (i.e. in this instance for the balance of the time before it is reconnected into service). As the solvent used and the polymer removed thereby are the same solvent and polymer employed in forming the initial cement-in-water emulsion, the solvent washing circuit is arranged as shown at 2400–2405 in FIG. 1A. While polymer does not usually accumulate as rapidly in the segregators 15A', 15B' (2215A, 2215B) as in the plate type surface heaters, for conveniences, the segregators are switched and subjected to solvent washing via line 2405 (FIG. 1A) concurrently with said surface heaters. After each 8 hour period, or when the viscosity of the resulting solution of polymer in the washing circuit begins to rise substantially, the solvent polymer solution from the circuit 2400–2405 is delivered to hold tank 6A, and after a determination of its solids content, is employed to constitute a part of the solvent and polymer charged to the dissolver 5 (FIG. 1). In this way the material selectively agglomerated and removed to produce a mechanically stable latex is recycled and recovered in the form in which it is immediately re-usable in the process with consequent saving in material and in processing expense.

Example 7

A rubber cement is prepared from 800 lbs of ethylene-propylene copolymer elastomer (Vistalon 2405, a trademarked product) and 5900 lbs. of toluene, and mixed with emulsifier solution to form a crude emulsion. The emulsifier solution comprises 200 lbs. of Alipal CO-433, 28% active (a trademarked product) and 11 lbs. of monosodium phosphate ($NaH_2PO_4$) and 3150 lbs. of water. The crude emulsion at 160° F. is converted to a fine emulsion by the procedure used in Example 3, and fed to the aerosol generator and concentrator system in the same manner as therein described with a proportion of steam sufficient to volatilize the toluene. Concurrently with this steam stripping of the emulsion in the aerosol generator, the resulting latex is partially concentrated to 20% solids in the circuit 2216–2220(A) or (B) of FIG. 3A, with water at 230° F. supplied to heat the heaters 2220(A) or (B), and then fed to the concentration equipment section of FIG. 3 and concentrated to 55% solids. The periodic washing of the filters, plate heaters and segregators, results in recovery of polymers estimated to constitute about 2% of the polymer charged. The latex product under microscopic examination shows essentially no non-colloidal particles and under the mechanical stability test aforesaid yields essentially no coagulum. While reference has been made to butyl rubber and ethylene-propylene elastomers, and emulsifiers and solvents appropriate therefor as typical of polymers and emulsifiers and solvent with which mechanically stable latices may be obtained by the improvements of the present invention, those skilled in the art will appreciate that the same improvements may be applied with advantage in the production of stable lactices from other materials of these classes including those exemplified and set forth in the aforesaid related applications. In particular, reference is made in this connection to the chlorinated butyl rubbers; the group of rubbery propylene polymers consisting of the rubbery ethylene-propylene copolymers, ethylene-propylenediene terpolymers, and amorphous polypropylene; solution polymerized diene polymer which contains more than 5 mole percent unsaturation, especially the solution polymerized butadiene polymers and copolymers and the solution polymerized isoprene polymers and copolymers; solvent-soluble solution polymerized plastomers; especially those selected from the group consisting of the solution polymerized plastomeric homopolymers and copolymers of ethylene and the plastomeric homopolymers and copolymers of propylene; and the solvent-soluble synthetic resins.

While there have been described herein what are at present considered preferred embodiments of the invention, it will be obvious to those skilled in the art that modifications and changes may be made without departing from the essence of the invention. For example, as is above indicated, the heating of the latex to effect destabilization of any larger than colloidal size particles therein may be effected by supplying heat to the aerosol formed in the mixtures (A) or (B) in FIG. 3A, either by employing segregators 2115(A) and (B) externally heated in whole or in part, as described in connection with elements 2220 (A) and (B), or by introduction of auxiliary steam into the aerosol passing downstream from the aerosol generators (A) and (B), FIG. 3A, to the segregators (A) and (B) therein, as described in connection with inlet 114G FIG. 4 (installed in the omitted section in FIG. 3A), or both. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. In the formation of a latex from an organic solvent dispersion of a composition of an organic solvent soluble or dispersible water insoluble polymer of one or more ethylenically unsaturated monomers containing from 2 to 20 carbon atoms, by a process which comprises:

1. providing a dispersion of the polymer composition in essentially water-immiscible volatile organic solvent which itself or as an azeotrope with water has a boiling point lower than that of water at atmospheric pressure,
2. adding water and emulsifier to said dispersion in proportions to form an emulsion having water as its continuum and emulsifying the same so that the discontinuous phase thereof is in particles at least principally of precursor latex particle size,
3. stripping the solvent from the emulsion to form a latex, and
4. recovering the latex product, and which comprises the particular steps of:

5. providing a moving flow of gas comprising steam as an initial continuous phase,
6. dispersing the said emulsion into the flow of gas as the initial continuous phase while subjecting the phases to a decrease of pressure and maintaining the temperature thereof below the limiting temperature for stability of the emulsion, thereby vaporizing solvent from the dispersed droplets and forming latex and vapor, 7. establishing a reduced pressure zone and maintaining the same at a pressure lower than that attained in step (6),
8. establishing a flow of latex through said reduced pressure zone,
9. introducing into said reduced pressure zone the latex droplets and vapor produced by step (6) and impinging said droplets upon the flow of latex therein,
10. withdrawing vapor from said reduced pressure zone, and
11. withdrawing the combined latices from said reduced pressure zone, the improvement which consists in the combination in the process of the further steps of:

12. passing the latex withdrawn in step (11) in contact with a surface heated in the range of 212° to 260°F. for a sufficient time to destabilize and coagulate from the latex particles of greater than colloidal size, which may be present in said latex, without substantially coagulating the latex particles of colloidal size, and
13. separating from the latex any coagulum formed.

2. Process as claimed in claim 1, in which the further step is included of
14. recycling the coagulum separated in step (13) to form part of the dispersion provided in step (1).

3. Process as claimed in claim 2, in which in step (14) coagulated polymer is dissolved in solvent the same as the used in step (1) and the resulting solution is employed to form a part of the solvent dispersion of polymer composition produced in step (1).

4. Process as claimed in claim 1, in which:
14. in step (12) the latex which has been passed in contact with the heated surface is subjected to a sufficient reduction of pressure to vaporize water therefrom and produce a more concentrated latex.

5. Process as claimed in claim 4, in which:
15. the concentrated latex and vapor formed in step (14) are introduced into said separating zone to form the flow of latex therein.

6. Process as claimed in claim 1, in which:
(14) the polymer composition provided in step (1) has a dry solids content within the range of 8 to 50%, by wt.

7. Process as claimed in claim 1, in which the polymer employed in step (1) consists essentially of rubbery polymer.

8. Process as claimed in claim 7, in which the rubbery polymer is selected from the butyl rubbers.

9. Process as claimed in claim 7, in which the rubbery polymer is selected from the chlorinated butyl rubbers.

10. Process as claimed in claim 7, in which the rubbery polymer is selected from the group of rubbery propylene polymers consisting of the rubbery ethylene-propylene copolymers, ethylene-propylene-diene terpolymers, and amorphous polypropylene.

11. Process as claimed in claim 7, in which the rubbery polymer is a solution polymerized conjugated diene polymer which contains more than 5 mole percent unsaturation.

12. Process as claimed in claim 11, in which the rubbery polymer is selected from the group consisting of the solution polymerized butadiene polymers and copolymers and the solution polymerized isoprene polymers and copolymers.

13. Process as claimed in claim 1, in which the organic polymer is a solvent-soluble solution polymerized synthetic plastic.

14. Process as claimed in claim 13, in which the synthetic plastic is selected from the group consisting of the solution polymerized plastomeric homopolymers and copolymers of ethylene and the plastomeric homopolymers and copolymers of propylene.

15. Process as claimed in claim 1, in which the organic polymer comprises organic solvent-soluble synthetic resin.

16. In the formation of a latex from an organic solvent dispersion of a composition of an organic solvent soluble or dispersible water insoluble polymer of one or more ethylenically unsaturated monomers containing from 2 to 20 carbon atoms, by a process which comprises:

1. providing a dispersion of the polymer composition in essentially water-immiscible volatile organic solvent which itself or as an azeotrope with water has a boiling point lower than that of water at atmospheric pressure,
2. adding water and emulsifier to said dispersion in proportions to form an emulsion having water as its continuum and emulsifying the same so that the discontinuous phase thereof is in particles at least principally of precursor latex particle size,
3. stripping the solvent from the emulsion to form a latex, and
4. recovering the latex product, and which comprises the particular steps of:
5. providing a moving flow of gas comprising steam as an initial continuous phase,
6. dispersing the said emulsion into the flow of gas as the initial continuous phase while subjecting the phases to a decrease of pressure and maintaining the temperature thereof below the limiting temperature for stability of the emulsion thereby vaporizing solvent from the dispersed droplets and forming latex and vapor, the improvement which consists in the combination in the process of the further steps of:
7. subjecting the latex prepared by step (6) to an increase in temperature sufficient to destabilize, and permit coagulation from the latex of, particles of greater than colloidal size that may be present therein without coagulating any large proprotion of the latex particles of colloidal size, and
8. separating from the latex any coagulum formed.

17. A process as claimed in claim 16, in which:
9. step (7) is practiced by passing the latex formed in step (6) in contact with a surface heated in the range of 212° to 260° F. for a sufficient time to effect the said destabilization of such particles of greater than colloidal size.

18. A process as claimed in claim 17, in which:
10. step (9) is practiced in the presence of solvent vapor produced in step (6).

19. A process as claimed in claim 16, in which:
9. step (7) is practiced by introducing into the latex formed in step (6) a quantity of steam sufficient in amount and temperature to effect the said destabilization of such particles of greater than colloidal size.

20. A process as claimed in claim 19, in which:
10. step (9) is practiced in the presence of solvent vapor produced in step (6).

21. A process as claimed in claim 20, in which:
11. the steam referred to in step (9) is introduced into the latex droplets and vapor formed by step (6) at a zone downstream from the zone of dispersion of the emulsion into the flow of steam as the initial continuous phase.

\* \* \* \* \*